(12) United States Patent
Tanizaki et al.

(10) Patent No.: US 11,701,620 B2
(45) Date of Patent: Jul. 18, 2023

(54) EXTERNAL CIRCULATION-TYPE HOLLOW FIBER MEMBRANE MODULE

(71) Applicant: MITSUBISHI CHEMICAL CLEANSUI CORPORATION, Shinagawa-ku (JP)

(72) Inventors: Yoshie Tanizaki, Tokyo (JP); Hiroyuki Okazaki, Tokyo (JP)

(73) Assignee: MITSUBISHI CHEMICAL CLEANSUI CORPORATION, Shinagawa-ku (JP)

( * ) Notice: Subject to any disclaimer, the term of this patent is extended or adjusted under 35 U.S.C. 154(b) by 0 days.

(21) Appl. No.: 16/711,992

(22) Filed: Dec. 12, 2019

(65) Prior Publication Data

US 2020/0114315 A1 Apr. 16, 2020

Related U.S. Application Data

(63) Continuation of application No. PCT/JP2018/022698, filed on Jun. 14, 2018.

(30) Foreign Application Priority Data

Jun. 14, 2017 (JP) .................................. 2017-116620
Jun. 14, 2017 (JP) .................................. 2017-117077
Sep. 8, 2017 (JP) .................................. 2017-173041

(51) Int. Cl.
*B01D 63/02* (2006.01)
*B01D 63/04* (2006.01)

(52) U.S. Cl.
CPC ......... *B01D 63/021* (2013.01); *B01D 63/043* (2013.01); *B01D 63/024* (2013.01);
(Continued)

(58) Field of Classification Search
CPC .... B01D 63/02; B01D 63/021; B01D 63/043; B01D 63/024; B01D 69/08; B01D 69/081;
(Continued)

(56) References Cited

U.S. PATENT DOCUMENTS 3,884,814 A 5/1975 Vogt et al.
4,367,139 A * 1/1983 Graham ................. B01D 53/22
210/321.9
(Continued)

FOREIGN PATENT DOCUMENTS

CN 2754712 Y 2/2006
CN 103239995 A 8/2013
(Continued)

OTHER PUBLICATIONS

English language machine translation of WO2007123004, 12 Pages, No Date.*
(Continued)

*Primary Examiner* — Pranav N Patel
(74) *Attorney, Agent, or Firm* — Oblon, McClelland, Maier & Neustadt, L.L.P.

(57) ABSTRACT

An external circulation-type hollow fiber membrane module which has a high processing capacity and which is capable of inhibiting a to-be-treated liquid within a case from flowing through a short path and efficiently bringing the liquid into contact with a hollow fiber membrane in whichever direction of a vertical direction, a horizontal direction, etc., the liquid flows. An external circulation-type hollow fiber membrane module is provided with: a hollow fiber membrane bundle; a case; and a short-path prevention body that blocks flowing of a to-be-treated liquid in a gap between the hollow fiber membrane bundle and the case, wherein a first end of the hollow fiber membrane bundle is fixed in the (Continued)

case, and the short-path prevention body is provided to the downstream side of a first port which is a liquid flow-in port in the case so as to project from the inner surface of the case.

11 Claims, 18 Drawing Sheets

(52) U.S. Cl.
CPC .... *B01D 2313/08* (2013.01); *B01D 2321/185* (2013.01); *B01D 2325/24* (2013.01)

(58) Field of Classification Search
CPC .......... B01D 2313/08; B01D 2313/086; B01D 2313/19; B01D 2313/24; B01D 2321/185; B01D 2325/24; B01D 19/00
See application file for complete search history.

(56) References Cited

U.S. PATENT DOCUMENTS

| | | | |
|---|---|---|---|
| 4,620,965 A | | 11/1986 | Fukusawa et al. |
| 4,756,875 A | * | 7/1988 | Tajima ................ B01D 63/024 376/313 |
| 5,316,724 A | | 5/1994 | Mathewson et al. |
| 5,730,712 A | * | 3/1998 | Falkvall ................ A61M 1/16 210/321.8 |
| 2004/0195165 A1 | * | 10/2004 | Bernard ................ B01D 63/02 210/321.89 |
| 2007/0119781 A1 | | 5/2007 | Huang et al. |
| 2013/0306544 A1 | * | 11/2013 | Ueno ................ B01D 71/76 210/321.79 |
| 2014/0319056 A1 | | 10/2014 | Fuchigami et al. |
| 2016/0158670 A1 | | 6/2016 | Tanizaki et al. |
| 2016/0354728 A1 | * | 12/2016 | Hori ................ B01D 65/10 |
| 2017/0087518 A1 | * | 3/2017 | Volmering ............. B01D 61/18 |
| 2017/0144896 A1 | * | 5/2017 | Takeda ................ C02F 1/283 |
| 2018/0036468 A1 | | 2/2018 | Anzai et al. |

FOREIGN PATENT DOCUMENTS

| | | | |
|---|---|---|---|
| CN | 105517693 A | | 4/2016 |
| JP | 55-000323 Y2 | | 1/1980 |
| JP | 55-107139 A | | 7/1980 |
| JP | 4-367714 A | | 12/1992 |
| JP | 5-161831 A | | 6/1993 |
| JP | 06-327905 A | | 11/1994 |
| JP | 09-099064 A | | 4/1997 |
| JP | 9-150041 A | | 6/1997 |
| JP | 2005-305432 A | | 11/2005 |
| JP | 2010-64039 A | | 3/2010 |
| JP | WO2015186831 A1 | * | 12/2015 |
| JP | WO2007123004 | * | 11/2017 |
| WO | WO 2008/088293 A1 | | 7/2008 |
| WO | WO 2013/065293 A1 | | 5/2013 |
| WO | WO 2015/012293 A1 | | 1/2015 |
| WO | WO 2015/137308 A1 | | 9/2015 |
| WO | WO 2016/104155 | | 6/2016 |
| WO | WO 2016/143751 A1 | | 9/2016 |

OTHER PUBLICATIONS

Office Action dated Jan. 7, 2020 in Japanese Patent Application No. 2018-535437 (with unedited computer generated English translation obtained by Global Dossier on Feb. 4, 2020), 10 pages.
Extended European Search Report dated Aug. 17, 2020 in European Patent Application No. 18818944.3, 17 pages.
Supplementary Partial European Search Report dated May 19, 2020 in European Patent Application No. 18818944.3, 15 pages.
International Search Report dated Aug. 14, 2018 in PCT/JP2018/022698 filed on Jun. 14, 2018 (with English Translation), 4 pages.
Office Action issued in Japanese Patent Application No. 2018-535437 (with English Translation), 6 pages.
Office Action dated Feb. 19, 2021 in corresponding Korean Patent Application No. 10-2019-7037776 (with English Translation), 19 pages.
Office Action dated Jun. 17, 2021, in Chinese patent application No. 201880038580.X, with Machine translation obtained by Global Dossier on Jul. 26, 2021, 20 pages.
Yang Lefang, "Industrialized New Textile Materials" 1st edition, p. 127, Donghua University Press 1st Edition Apr. 2012—4 pages.
Combined Chinese Office Action and Search Report dated Jan. 13, 2022 in corresponding Chinese Patent Application No. 201880038580.X (with English Translation), 23 pages.
Decision of Rejection dated Jul. 8, 2022, in Chinese patent application No. 201880038580.X, w/ partial English translation 8 pages.
Office Action dated Apr. 3, 2023, in European patent application No. 18818944.3. 12 pages.

* cited by examiner

PRIOR ART

EXTERNAL CIRCULATION-TYPE HOLLOW FIBER MEMBRANE MODULE

This application is a continuation application of International Application No. PCT/JP2018/022698, filed on Jun. 14, 2018, which claims the benefit of priority from the prior Japanese Patent Applications No. 2017-116620 filed on Jun. 14, 2017, No. 2017-117077 filed on Jun. 14, 2017, and No. 2017-173041 filed on Sep. 8, 2017, the contents of which are incorporated herein by reference.

TECHNICAL FIELD

The present invention relates to an external circulation-type hollow fiber membrane module.

BACKGROUND ART

As a gas-liquid separation hollow fiber membrane module, there are an internal circulation type in which a to-be-treated liquid passes through an inside of a hollow fiber membrane and an external circulation type in which the to-be-treated liquid passes through an outside of the hollow fiber membrane. For example, as a gas-liquid separation hollow fiber membrane module, there is a known external circulation-type hollow fiber membrane module which vacuums an inside of a hollow fiber membrane while causing a to-be-treated liquid to flow around the hollow fiber membrane in a case, thereby taking dissolved gas in the to-be-treated liquid into the membrane to perform deaeration or supplying gas to the hollow fiber membrane to suck gas into the to-be-treated liquid.

For example, the gas-liquid separation hollow fiber membrane module is installed in an inkjet discharge device, a pure water production device, etc. as a module for deaeration. Among inkjet discharge devices, in a large-scale inkjet printer for business use, a color filter manufacturing device, etc., since a large amount of liquid medicine is used, a liquid medicine tank is installed in a main body of the device, and a liquid medicine such as ink or a photoresist solution is sent out from the liquid medicine tank during operation of the inkjet discharge device. In this instance, when bubbles are included in the liquid medicine, the discharge accuracy may be reduced, and the quality of printed matter may be defective. In order to prevent this, a gas-liquid separation hollow fiber membrane module is provided. In recent years, the size and speed of the device have been increased, and an external circulation-type hollow fiber module that can be processed with a lower pressure loss has been favorably used.

As the external circulation-type hollow fiber membrane module, there are a known module in which only a first end in a length direction of a hollow fiber membrane bundle is fixed by a potting portion in a case, and a known module in which both a first end and a second end in a length direction of a hollow fiber membrane bundle are fixed by a potting portion in a case (Patent Documents 1 and 2). When at least an open end of each hollow fiber membrane at the first end is fixed while maintaining an open state, it is possible to vacuum an inside of the hollow fiber membrane to deaerate a to-be-treated liquid or supply gas into the hollow fiber membrane to aerate a to-be-treated liquid.

As a specific example of the external circulation-type hollow fiber membrane module, for example, as illustrated in FIG. 20, there is an external circulation-type hollow fiber membrane module 3101 in which one end of a hollow fiber membrane bundle 3110 obtained by bundling a plurality of hollow fiber membranes 3111 in a columnar shape is fixed inside a case 3114 by a potting portion 3116 and the other end of the hollow fiber membrane bundle 3110 is a free end (for example, Patent Document 1). In the external circulation-type hollow fiber membrane module 3101, water conduction is performed so that a liquid flows in from a first port 3124 provided in a case body 3118 and the liquid flows out from a third port 3122c provided in a second lid member 3122, and the liquid is circulated to an outside of each hollow fiber membrane 3111 of the hollow fiber membrane bundle 3110. In this state, a second port 3120c provided in a first lid member 3120 is connected to a vacuum pump, and an inside of each hollow fiber membrane 3111 is depressurized. In this way, deaeration can be performed by taking dissolved gas in an externally circulated liquid into each hollow fiber membrane 3111 to suck the dissolved gas.

CITATION LIST

Patent Document

Patent Document 1: WO 2015/012293 A
Patent Document 2: JP 6-327905 A

SUMMARY OF THE INVENTION

Problem to be Solved by the Invention

In a module such as that of Patent Documents 1 and 2, when a filling rate of the hollow fiber membrane in the case is excessively high, a filling operation of the hollow fiber membrane becomes difficult, the pressure loss increases, and the processing efficiency decreases.

For this reason, in general, adjustment is performed such that the case is not overfilled with the hollow fiber membrane. A to-be-treated liquid introduced into the case is appropriately taken into the hollow fiber membrane bundle and processed. However, in particular, in the case of processing at a high flow rate, a large amount of to-be-treated liquid flows out of the case without being sufficiently processed by flowing through a short path outside the membrane bundle rather than being introduced into the membrane bundle.

A first problem of the invention is to provide an external circulation-type hollow fiber membrane module having a high processing capacity which inhibits the to-be-treated liquid from flowing through a short path in the case and can efficiently bring the to-be-treated liquid into contact with the hollow fiber membrane regardless of a direction such as a vertical direction or a horizontal direction in which to-be-treated liquid flows.

In addition, in the external circulation-type hollow fiber membrane module of Patent Document 1, when the hollow fiber membrane has a small outer diameter, the case can be filled with more hollow fiber membranes, and liquid contact with the to-be-treated liquid becomes more efficient.

However, in a case in which the module is enlarged so that the hollow fiber membranes are elongated, and the flow rate of the to-be-treated liquid is increased, when the hollow fiber membrane has a small outer diameter and low rigidity, it is difficult to maintain the shape of the hollow fiber membrane bundle in the case, the shape of the hollow fiber membrane bundle is in disorder, and thus deaeration efficiency tends to be lowered.

A second problem of the invention is to provide an external circulation-type hollow fiber membrane module capable of ensuring a shape maintaining property of the hollow fiber membrane bundle even when the module is enlarged so that the hollow fiber membranes are elongated, and the flow rate of the to-be-treated liquid is increased, and capable of suppressing a decrease in deaeration efficiency regardless of a direction such as a vertical direction or a horizontal direction in which to-be-treated liquid flows.

In addition, in a conventional external circulation-type hollow fiber membrane module such as the external circulation-type hollow fiber membrane module 3101, when the module is enlarged and the flow rate of the liquid to be circulated is increased, the liquid unevenly flows without spreading over the entire hollow fiber membrane bundle in the case, and efficiency of deaeration or aeration tends to decrease.

A third problem of the invention is to provide an external circulation-type hollow fiber membrane module capable of inhibiting the liquid from unevenly flowing in the case and capable of suppressing a decrease in efficiency of deaeration or aeration even when the module is enlarged and the flow rate of the liquid to be circulated is increased.

Means for Solving Problem

The invention has the following aspects.

[1] An external circulation-type hollow fiber membrane module for removing gas from a to-be-treated liquid or supplying gas to the to-be-treated liquid, the hollow fiber membrane module including
a hollow fiber membrane bundle formed of a plurality of aligned hollow fiber membranes,
a case in which the hollow fiber membrane bundle is accommodated, and
a short-path prevention body that blocks a flow of the to-be-treated liquid in a gap between the hollow fiber membrane bundle and the case,
in which at least a first end of the hollow fiber membrane bundle in a length direction is fixed in the case by a potting portion while an open state of an open end of each of the hollow fiber membranes is maintained, and
the short-path prevention body is provided on a downstream side of a liquid flow-in port that allows the to-be-treated liquid to flow in around the hollow fiber membranes in the case to protrude from an inner surface of the case.

[2] The external circulation-type hollow fiber membrane module according to item [1], in which a Gurley bending resistance of the hollow fiber membranes is 15 mN or more.

[3] The external circulation-type hollow fiber membrane module according to item [1] or [2], in which the to-be-treated liquid flows in one direction in the length direction in the case, and a partition that changes the flow of the to-be-treated liquid other than the short-path prevention body is not provided in the case.

[4] An external circulation-type hollow fiber membrane module for removing gas from a to-be-treated liquid or supplying gas to the to-be-treated liquid, the hollow fiber membrane module including
a hollow fiber membrane bundle formed of a plurality of aligned hollow fiber membranes, and
a case in which the hollow fiber membrane bundle is accommodated,
in which at least a first end of the hollow fiber membrane bundle in a length direction is fixed in the case by a potting portion while an open state of an open end of each of the hollow fiber membranes is maintained, and
a Gurley bending resistance of the hollow fiber membranes is 15 mN or more.

[5] The external circulation-type hollow fiber membrane module according to any one of items [1] to [3], in which the short-path prevention body has an annular shape that surrounds the hollow fiber membrane bundle over a whole circumference.

[6] The external circulation-type hollow fiber membrane module according to any one of items [1] to [5], in which each of the hollow fiber membranes is a composite hollow fiber membrane that includes a homogeneous layer having gas permeability and a porous support layer supporting the homogeneous layer.

[7] The external circulation-type hollow fiber membrane module according to any one of items [1] to [6], in which an outer diameter of the hollow fiber membrane is 350 µm or less.

[8] The external circulation-type hollow fiber membrane module according to any one of items [1] to [7], in which a breaking strength of the hollow fiber membrane is 0.5 N/fil or more and a breaking elongation of the hollow fiber membrane is 50% or more.

[9] The external circulation-type hollow fiber membrane module according to any one of items [1] to [8], in which a filling rate of the hollow fiber membrane bundle in the case in a cross section obtained by cutting the case in a direction perpendicular to the length direction of the hollow fiber membrane bundle is in a range of 20 to 50%.

[10] The external circulation-type hollow fiber membrane module according to any one of items [1] to [9], in which each of the plurality of hollow fiber membranes is bundled in a state of being folded in a U-shape at a center in the length direction and fixed in the case by the potting portion while open ends on both sides of each hollow fiber membrane maintain an open state at the first end.

[11] The external circulation-type hollow fiber membrane module according to item [10], in which positions of ends of the respective hollow fiber membranes folded back in U-shapes are aligned on substantially the same plane at a second end of the hollow fiber membrane bundle on an opposite side from the first end.

[12] The external circulation-type hollow fiber membrane module according to any one of items [1] to [9], in which both the first end of the hollow fiber membrane bundle formed by aligning a plurality of hollow fiber membranes in one direction and a second end on an opposite side from the first end are fixed in the case by potting portions, respectively.

[13] An external circulation-type hollow fiber membrane module including
a hollow fiber membrane bundle in which a plurality of hollow fiber membranes is bundled in a tubular shape so that a cavity is formed inside, and
a case in which the hollow fiber membrane bundle is accommodated,
a first end of the hollow fiber membrane bundle in a length direction being fixed in the case by a potting portion while an end surface of each of the hollow fiber membranes is open,
a second end on an opposite side from the first end in the hollow fiber membrane bundle corresponding to a free end,
a liquid being circulated outside each of the hollow fiber membranes on a second end side of the potting portion in the case,
in which the hollow fiber membrane bundle is exclusively provided in a region between the potting portion and the second end in the case.

[14] The external circulation-type hollow fiber membrane module according to any one of items [1] to [13], in which the plurality of hollow fiber membranes is bundled in a state of being connected to each other by a warp.

Other aspects of the invention have the following aspects.

[A1] An external circulation-type hollow fiber membrane module for removing gas from a to-be-treated liquid or supplying gas to the to-be-treated liquid, the hollow fiber membrane module including
- a hollow fiber membrane bundle formed of a plurality of aligned hollow fiber membranes,
- a case in which the hollow fiber membrane bundle is accommodated, and
- a short-path prevention body that blocks a flow of the to-be-treated liquid in a gap between the hollow fiber membrane bundle and the case,
- in which at least a first end of the hollow fiber membrane bundle in a length direction is fixed in the case by a potting portion while an open state of an open end of each of the hollow fiber membranes is maintained, and
- the short-path prevention body is provided on a downstream side of a liquid flow-in port that allows the to-be-treated liquid to flow in around the hollow fiber membranes in the case to protrude from an inner surface of the case.

[A2] The external circulation-type hollow fiber membrane module according to item [A1], in which the short-path prevention body has an annular shape that surrounds the hollow fiber membrane bundle over a whole circumference.

[A3] The external circulation-type hollow fiber membrane module according to item [A1] or [A2], in which each of the hollow fiber membranes is a composite hollow fiber membrane that includes a homogeneous layer having gas permeability and a porous support layer supporting the homogeneous layer.

[A4] The external circulation-type hollow fiber membrane module according to any one of items [A1] to [A3], in which an outer diameter of the hollow fiber membrane is 350 μm or less.

[A5] The external circulation-type hollow fiber membrane module according to any one of items [A1] to [A4], in which a breaking strength of the hollow fiber membrane is 0.5 N/fil or more and a breaking elongation of the hollow fiber membrane is 50% or more.

[A6] The external circulation-type hollow fiber membrane module according to any one of items [A1] to [A5], in which a filling rate of the hollow fiber membrane bundle in the case in a cross section obtained by cutting the case in a direction perpendicular to the length direction of the hollow fiber membrane bundle is in a range of 20 to 50%.

[A7] The external circulation-type hollow fiber membrane module according to any one of items [A1] to [A6], in which each of the plurality of hollow fiber membranes is bundled in a state of being folded in a U-shape at a center in the length direction and fixed in the case by the potting portion while open ends on both sides of each hollow fiber membrane maintain an open state at the first end.

[A8] The external circulation-type hollow fiber membrane module according to item [A7], in which positions of ends of the respective hollow fiber membranes folded back in U-shapes are aligned at a second end of the hollow fiber membrane bundle on an opposite side from the first end.

[A9] The external circulation-type hollow fiber membrane module according to any one of items [A1] to [A6], in which both the first end of the hollow fiber membrane bundle formed by aligning a plurality of hollow fiber membranes in one direction and a second end on an opposite side from the first end are fixed in the case by potting portions, respectively.

[A10] The external circulation-type hollow fiber membrane module according to any one of items [A1] to [A9], in which the plurality of hollow fiber membranes is bundled in a state of being connected to each other by a warp.

Further, other aspects of the invention have the following configurations.

[B1] A gas-liquid separation hollow fiber membrane module including
- a hollow fiber membrane bundle in which a plurality of hollow fiber membranes is bundled, and
- a case in which the hollow fiber membrane bundle is accommodated,
- in which at least one end of the hollow fiber membrane bundle in a length direction is fixed in the case by a potting portion while an end surface of each of the hollow fiber membranes is open,
- an outer diameter of the hollow fiber membrane is 350 μm or less, and
- a Gurley bending resistance of the hollow fiber membranes is 15 mN or more. [B2] The gas-liquid separation hollow fiber membrane module according to item [B1], in which the gas-liquid separation hollow fiber membrane module has an external circulation type in which a to-be-treated liquid is circulated outside each hollow fiber membrane in the case.

[B3] The gas-liquid separation hollow fiber membrane module according to item [B1] or [B2], in which the hollow fiber membrane is a composite hollow fiber membrane that includes a homogeneous layer having gas permeability and a porous support layer supporting the homogeneous layer.

[B4] The gas-liquid separation hollow fiber membrane module according to any one of items [B1] to [B3], in which a breaking strength of the hollow fiber membrane is 0.5 N/fil or more and a breaking elongation of the hollow fiber membrane is 50% or more.

[B5] The gas-liquid separation hollow fiber membrane module according to any one of items [B1] to [B4], in which a filling rate of the hollow fiber membrane bundle in the case in a cross section obtained by cutting the case in a direction perpendicular to the length direction of the hollow fiber membrane bundle is in a range of 20 to 50%.

[B6] The gas-liquid separation hollow fiber membrane module according to any one of items B11 to [B5],
- in which each of the plurality of hollow fiber membranes is bundled in a state of being folded in a U-shape at a center in the length direction to form the hollow fiber membrane bundle, and
- a first end on an opposite side from a U-turn portion of each hollow fiber membrane in the hollow fiber membrane bundle is fixed in the case by the potting portion while end surfaces on both sides of each hollow fiber membrane are open.

[B7] The gas-liquid separation hollow fiber membrane module according to item [B6], in which positions of ends of the respective hollow fiber membranes are aligned at a second end of the hollow fiber membrane bundle on an opposite side from the first end.

[B8] The gas-liquid separation hollow fiber membrane module according to any one of items [B1] to [B7], in which the plurality of hollow fiber membranes is bundled in a state of being connected to each other by a warp.

Further, other aspects of the invention have the following configurations.

[C1] An external circulation-type hollow fiber membrane module including
a hollow fiber membrane bundle in which a plurality of hollow fiber membranes is bundled in a tubular shape so that a cavity is formed inside, and
a case in which the hollow fiber membrane bundle is accommodated,
a first end of the hollow fiber membrane bundle in a length direction being fixed in the case by a potting portion while an end surface of each of the hollow fiber membranes is open,
a second end on an opposite side from the first end in the hollow fiber membrane bundle corresponding to a free end,
a liquid being circulated outside each of the hollow fiber membranes on a second end side of the potting portion in the case,
in which the hollow fiber membrane bundle is exclusively provided in a region between the potting portion and the second end in the case.

[C2] The external circulation-type hollow fiber membrane module according to item [C1], in which each of the hollow fiber membranes is a composite hollow fiber membrane that includes a homogeneous layer having gas permeability and a porous support layer supporting the homogeneous layer.

[C3] The external circulation-type hollow fiber membrane module according to item [C1] or [C2], in which an outer diameter of the hollow fiber membrane is 350 μm or less.

[C4] The external circulation-type hollow fiber membrane module according to any one of claims [C1] to [C3], in which a Gurley bending resistance of the hollow fiber membranes is 3 mN or more.

[C5] The external circulation-type hollow fiber membrane module according to any one of items [C1] to [C4], in which a breaking strength of the hollow fiber membrane is 0.5 N/fil or more and a breaking elongation of the hollow fiber membrane is 50% or more.

[C6] The external circulation-type hollow fiber membrane module according to any one of items [C1] to [C5], in which a filling rate of the hollow fiber membrane bundle in the case in a cross section obtained by cutting the case in a direction perpendicular to the length direction of the hollow fiber membrane bundle is in a range of 20 to 50%.

[C7] The external circulation-type hollow fiber membrane module according to any one of items [C1] to [C6], in which each of the plurality of hollow fiber membranes is bundled in a state of being folded in a U-shape at a center in the length direction and fixed in the case by the potting portion while end surfaces on both sides of each of the plurality of hollow fiber membranes are open.

[C8] The external circulation-type hollow fiber membrane module according to any one of items [C1] to [C7], in which positions of ends of the respective hollow fiber membranes are aligned at the second end of the hollow fiber membrane bundle.

[C9] The external circulation-type hollow fiber membrane module according to any one of items [C1] to [C8], in which the plurality of hollow fiber membranes is bundled in a state of being connected to each other by a warp.

Effect of the Invention

An external circulation-type hollow fiber membrane module of a first aspect of the invention having a configuration of item [1] inhibits the to-be-treated liquid from flowing through a short path in the case, can efficiently bring the to-be-treated liquid into contact with the hollow fiber membranes, and has high processing capacity.

If an external circulation-type hollow fiber membrane module of a second aspect of the invention having a configuration of item [3] is used, even when the module is enlarged so that the hollow fiber membranes are elongated, and the flow rate of the to-be-treated liquid increases, it is possible to ensure a shape maintaining property of the hollow fiber membrane bundle, and to suppress a decrease in deaeration efficiency.

If an external circulation-type hollow fiber membrane module of a third aspect of the invention having a configuration of item [12] is used, even when the module is enlarged to increase the flow rate of the liquid to be circulated, it is possible to inhibit the liquid from unevenly flowing in the case, and to suppress a decrease in deaeration or aeration efficiency.

MODE(S) FOR CARRYING OUT THE INVENTION

[First Aspect]

An external circulation-type hollow fiber membrane module of a first aspect of the invention is a hollow fiber membrane module for removing gas from a to-be-treated liquid or supplying gas to the to-be-treated liquid. For example, the external circulation-type hollow fiber membrane module of the first aspect of the invention can be used for an inkjet discharge device such as an inkjet printer or a color filter manufacturing device.

Hereinafter, a description will be given of an example of the external circulation-type hollow fiber membrane module of the first aspect of the invention. Incidentally, dimensions, etc. of drawings illustrated in the following description are merely examples, and the first aspect of the invention is not limited thereto and may be appropriately modified and implemented within a range not changing a gist thereof.

Figure 1:
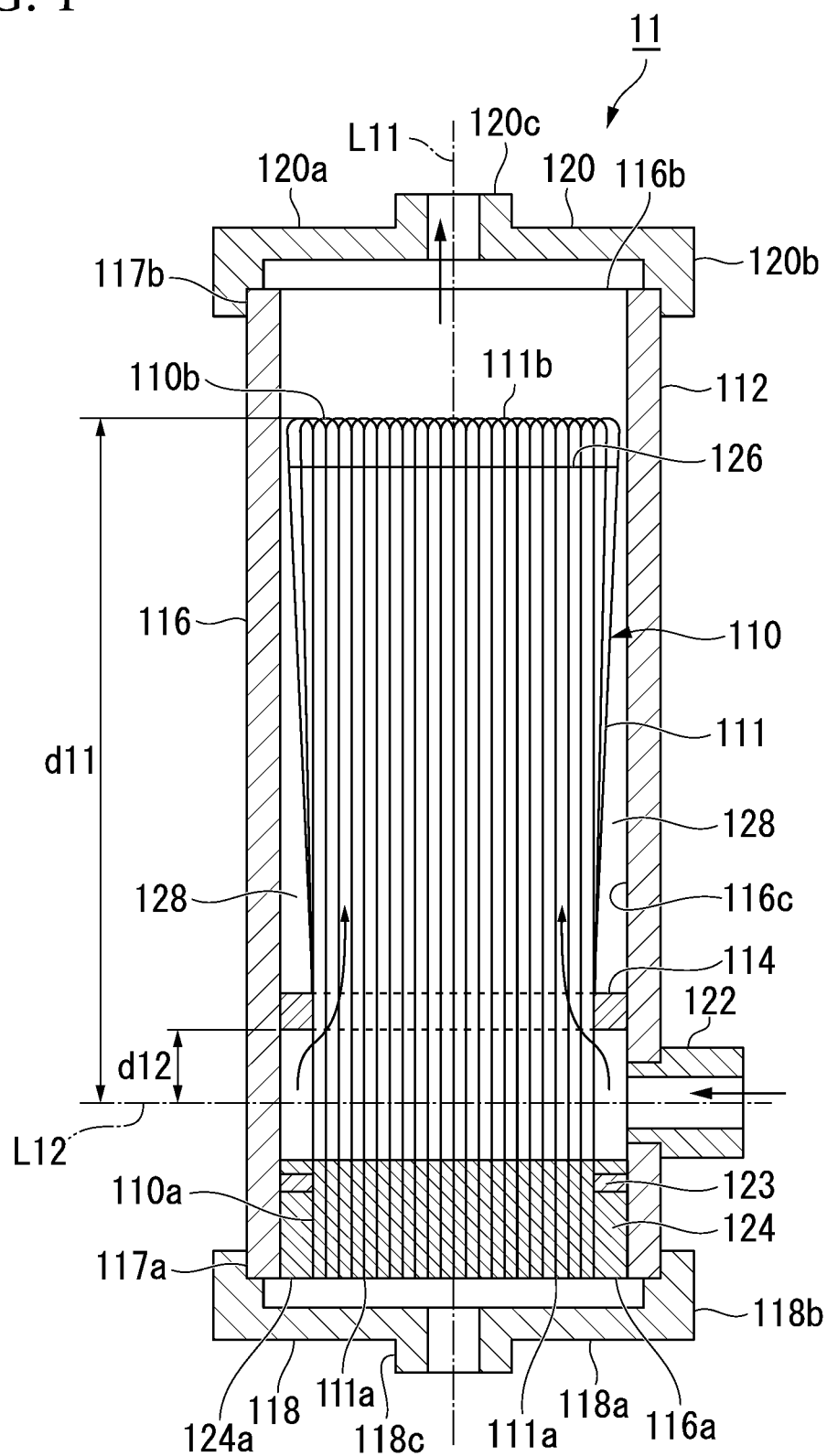
FIG. 1 is a cross-sectional view illustrating an example of an external circulation-type hollow fiber membrane module of a first aspect of the invention.

As illustrated in FIG. 1, an external circulation-type hollow fiber membrane module 11 (hereinafter also referred to as a "module 11") of the present embodiment includes a hollow fiber membrane bundle 110, a case 112, and a short-path prevention body 114.

The case 112 includes a cylindrical case body 116, a first lid member 118 provided on a first open end 116a side of the case body 116 in the length direction, and a second lid member 120 provided on a second open end 116b side of the case body 116. The case 112 has a columnar appearance due to the case body 116, the first lid member 118, and the second lid member 120. As the case, it is preferable to use a case having a columnar appearance which includes a cylindrical case body as in this example. Incidentally, in the first aspect of the invention, the case is not limited to the case having the columnar appearance. For example, it is possible to adopt a case having a polygonal prism-shaped appearance which includes a prismatic case body.

A cylindrical first port 122 that communicates with the inside of the case body 116 is provided at a portion of the case body 116 of the case 112 near the first open end 116a so as to protrude outward from an outer peripheral surface of the case body 116. Incidentally, a shape of the first port 122 is not limited to the cylindrical shape. For example, a prismatic shape, etc. may be adopted.

The first lid member 118 includes a circular flat plate portion 118a, a tube 118b provided to protrude from an outer peripheral edge of the flat plate portion 118a to the case body 116 side over a whole circumference, and a second port 118c provided to protrude from a central portion of the flat plate portion 118a to the outside. A first end 117a of the case body 116 is fit to the tube 118b, and the first lid member 118 is attached to the case body 116. The second port 118c is located on a central axis L11 in the case 112.

The second port 118c has a cylindrical shape and functions as a gas flow-out port that allows gas to flow out of the case 112 or a gas flow-in port that allows gas to flow in. The shape of the second port 118c is not limited to the cylindrical shape, and may be, for example, a prismatic shape.

The second lid member 120 includes a circular flat plate portion 120a, a tube 120b provided to protrude from an outer peripheral edge of the flat plate portion 120a to the case body 116 side over a whole circumference, and a cylindrical third port 120c provided to protrude from a central portion of the flat plate portion 120a to the outside. A second end 117b of the case body 116 is fit to the tube 120b, and the second lid member 120 is attached to the case body 116. The third port 120c is located on the central axis L11 in the case 112.

A shape of the third port 120c is not limited to a cylindrical shape. For example, a prismatic shape, etc. may be adopted.

Further, the flat plate portion 120a may have a tapered shape so that bubbles in the case 112 efficiently come out.

In the module 11, no partition is provided in the case 112, the first port 122 is provided near the first open end 116a of the case body 116, and the third port 120c is provided in the second lid member 120 installed on the second open end 116b side of the case body 116. In this example, the first port 122 is a liquid flow-in port, and the third port 120c is a liquid flow-out port. The to-be-treated liquid flowing in from the first port 122 flows in one direction in the length direction of the case 112 toward the third port 120c, and the flow does not change to a reverse direction in the case 112. Depending on the installation situation, it is possible to adopt a one-direction water conduction in which the liquid flow is reversed by using the first port 122 as a liquid flow-out port and using the third port 120c as a liquid flow-in port.

A size of the case 112 can be set as appropriate. For example, the outer diameter and length of the case body 116 can be appropriately changed. In the case of the cylindrical case body 116, the outer diameter of the case body 116 can be set to 3 to 15 cm and the length thereof can be set to 5 to 50 cm.

A material for forming the case 112 is preferably a material that can ensure sufficient mechanical strength and durability. For example, it is possible to use polycarbonate, polysulfone, polyolefin, polyvinyl chloride (PVC), acrylic resin, ABS resin, modified polyphenylene ether (PPE), etc. As the material for forming the case 112, one type may be used alone, or two or more types may be used in combination.

The hollow fiber membrane bundle 110 is formed by bundling a plurality of aligned hollow fiber membranes 111 in a columnar shape. Each of the plurality of hollow fiber membranes 111 forming the hollow fiber membrane bundle 110 is bundled in a state of being folded in a U-shape at a center in the length direction. The form of the hollow fiber membrane bundle 110 is not limited to the columnar shape, and may be, for example, a form bundled in a cylindrical shape with a cavity disposed in the center.

The hollow fiber membrane bundle 110 is accommodated in the case 112, and a first end 110a of the hollow fiber membrane bundle 110 in the length direction is fixed in the case 112 by a potting portion 124 in a state of being restrained by a restraining ring 123. Open ends 111a on both sides of each hollow fiber membrane 111 folded in a U-shape are maintained in an open state at an end surface 124a on the first lid member 118 side of the potting portion 124.

A second end 110b including a U-turn portion of each hollow fiber membrane 111 located on the opposite side from the first end 110a in the hollow fiber membrane bundle 110 is not fixed to the case 112 and is a free end. In this way, since the to-be-treated liquid easily spreads between the hollow fiber membranes 111 over the entire hollow fiber membrane bundle 110, it is possible to perform deaeration or aeration of the to-be-treated liquid with high efficiency.

In the first aspect of the invention, as in this example, it is preferable that each of a plurality of hollow fiber membranes is bundled in a state of being folded in a U-shape at the center in the length direction and fixed in the case by the potting portion while maintaining the open state of the open ends on both sides of each hollow fiber membrane. Since the respective hollow fiber membranes are bundled in such a state, it becomes easy to sufficiently increase the filling rate of the hollow fiber membrane bundle using a small number of hollow fiber membranes, and the production efficiency is improved. In addition, to maintain a self-sustaining state of the hollow fiber membrane bundle and allow the to-be-treated liquid to easily spread between the respective hollow fiber membranes over the entire hollow fiber membrane bundle, it is preferable to form an aggregate of small bundles of hollow fiber membranes using a knitted fabric of a plurality of bundles, thereby improving the efficiency of deaeration or aeration.

The first open end 116a of the case body 116 is clogged by the potting portion 124. A space is formed on the first lid member 118 side of the end surface 124a of the potting portion 124 in the case 112, and the space and a space on the second open end 116b side of the potting portion 124 in the case body 116 are partitioned by the potting portion 124. Since the open ends 111a on both sides of each hollow fiber membrane 111 are maintained in an open state at the first end 110a of the hollow fiber membrane bundle 110, the inside of each hollow fiber membrane 111 and the space on the first lid member 118 side of the potting portion 124 in the case 112 are in communication with each other.

In the hollow fiber membrane bundle 110, the respective hollow fiber membranes 111 are bundled in a state of being connected to each other by a warp 126. Specifically, at a portion near the U-turn portion in each hollow fiber membrane 111, the plurality of hollow fiber membranes 111 are woven using the warp 126 in a direction orthogonal to the central axis L11, that is, a direction orthogonal to the length direction of each hollow fiber membrane 111, thereby connecting the mutual hollow fiber membranes 111 to each other. In the first aspect of the invention, it is preferable that the respective hollow fiber membranes are bundled in such a state of being connected to each other using the warp as described above. In this way, even when the to-be-treated liquid has a high viscosity as ink, etc., it is possible to inhibit the respective hollow fiber membranes forming the hollow fiber membrane bundle from coming loose, and the hollow fiber membrane bundle can easily maintain a self-sustaining state.

An aspect in which a plurality of hollow fiber membranes is connected by a warp is not particularly limited. For example, an aspect of weaving in a chain stitch type can be mentioned.

In the second end 110b of the hollow fiber membrane bundle 110, positions of ends 111b including U-turn portions in the respective hollow fiber membranes 111 are substantially aligned with each other in a direction of the central axis L11 of the case 112. That is, lengths of portions exposed from the potting portion 124 in the respective hollow fiber membranes 111 are aligned with each other. The statement that the positions of the ends 111b of the respective hollow fiber membranes 111 are substantially aligned with each other means that an error of the length of each hollow fiber membrane 111 with respect to an average value of lengths of portions exposed from the potting portion 124 in all the hollow fiber membranes 111 forming the hollow fiber membrane bundle 110 is ±5%.

In the first aspect of the invention, as described above, it is preferable that the ends of the respective hollow fiber membrane bundles folded in the U-shapes are aligned with each other at the second end of the hollow fiber membrane bundle. In this way, it becomes easy to inhibit the to-be-treated liquid from locally unevenly flowing in the case. In addition, the hollow fiber membrane bundle is easily inhibited from being deformed, the to-be-treated liquid easily spreads over the entire hollow fiber membrane bundle, and efficiency of deaeration or aeration is improved.

As the hollow fiber membrane 111, it is preferable to use a hollow fiber membrane having gas permeability that allows gas to pass between a hollow portion in the membrane and the outside of the membrane. In addition, from a viewpoint that strength is excellent and deaeration or aeration is more efficiently performed, it is more preferable to use, as the hollow fiber membrane 111, a composite hollow fiber membrane having a gas permeable homogeneous layer and a porous support layer supporting the homogeneous layer.

As a structure of the composite hollow fiber membrane, it is preferable to adopt a two-layer structure in which the porous support layer is provided on the inside or the outside of the homogeneous layer or a three-layer structure in which porous support layers are provided on both the inside and the outside of the homogeneous layer, and the three-layer structure is more preferable in terms of strength and performance of deaeration or aeration.

As a material for forming the homogeneous layer, a known material can be used, and examples thereof include silicon rubber resin, polyolefin resin, fluorine-containing resin, cellulose resin, polyphenylene oxide, poly-4-vinylpyridine, urethane resin, etc. One type of these materials may be used, and two or more types of these materials may be combined. Among these materials, as a material for forming the homogeneous layer, polyolefin resin is preferable since this material has excellent deaeration or aeration performance even when the to-be-treated liquid is circulated at a high flow rate and this material has excellent chemical resistance, and a low-density polyethylene resin is more preferable since this material has an excellent membrane production property.

Examples of polyolefin resin include a copolymer of ethylene and α-olefin, poly-4-methylpentene-1, metallocene polyethylene, low-density polyethylene, high-density polyethylene, linear low-density polyethylene, linear ultra-low-density polyethylene, polypropylene, ionomer resin, ethylene/vinyl acetate copolymer, ethylene/(meta)acrylic acid copolymer, ethylene/(meta)acrylic acid methyl copolymer, modified polyolefin, etc.

As a material for forming the porous support layer, a known material can be used. Examples thereof include silicon rubber resin such as polydimethylsiloxane or a copolymer of silicone and polycarbonate; polyolefin resin such as poly-4-methylpentene-1, poly-3-methylbutene-1, high-density polyethylene, or polypropylene; fluorine-containing resin such as polyvinylidene fluoride or polytetrafluoroethylene; cellulosic resin such as ethyl cellulose; polyphenylene oxide; poly-4-vinylpyridine; urethane resin; polystyrene; polyetheretherketone; polyetherketone, etc. One type of these materials may be used alone, or two or more types thereof may be used in combination. Among these materials, from a viewpoint of easily ensuring the self-sustaining property of the hollow fiber membrane bundle and obtaining membrane production stability, high-density polyethylene that exhibits an MFR value equivalent to that of the homogeneous layer is preferably used as the material for forming the porous support layer.

A pore size of the porous support layer is preferably in a range of 0.01 to 1 µm.

A porosity of the porous support layer is preferably in a range of 30 to 80% by volume. When the porosity is equal to or greater than a lower limit of the above range, deaeration or aeration performance is excellent. When the porosity is equal to or less than an upper limit of the above range, the mechanical strength such as pressure resistance of the hollow fiber membrane is improved.

An outer diameter of the hollow fiber membrane 111 is preferably 350 µm or less, more preferably 150 to 330 µm, and even more preferably 200 to 300 µm. When the outer diameter of the hollow fiber membrane 111 is within the above range, a more efficient flow path can be formed between the hollow fiber membranes 111 in the case 112.

An inner diameter of the hollow fiber membrane 111 is preferably 100 µm or more, more preferably 120 to 250 µm, and even more preferably 130 to 200 µm. When the inner diameter of the hollow fiber membrane 111 is within the above range, a sufficient number of hollow fiber membranes 111 can be accommodated in the case 112, and the performance of deaeration or aeration and durability can be easily maintained.

A membrane thickness of the hollow fiber membrane 111 is preferably 20 to 70 µm, and more preferably 25 to 55 µm.

When the membrane thickness of the hollow fiber membrane 111 is equal to or less than the upper limit, the durability when the inside of the hollow fiber membrane 111 in the case 112 is repeatedly depressurized or pressurized is excellent. When the membrane thickness of the hollow fiber membrane 111 is equal to or greater than a lower limit of the above range, it is easy to maintain excellent performance of deaeration or aeration.

Incidentally, the membrane thickness of the hollow fiber membrane is calculated by the following Equation (1) from a difference between the inner diameter and the outer diameter of the hollow fiber membrane.

$$\text{Membrane thickness of hollow fiber membrane} = (\text{outer diameter of hollow fiber membrane} - \text{inner diameter of hollow fiber membrane})/2 \quad (1)$$

The inner diameter and the outer diameter of the hollow fiber membrane are measured by a method described in paragraph [0062] of WO 2015/012293 A.

Thicknesses of the homogeneous layer and the porous support layer may be appropriately set so that the membrane thickness is within the range. The thickness of the homogeneous layer is preferably in a range of 0.3 to 2 µm, more preferably in a range of 0.5 to 1.2 µm.

The thicknesses of the homogeneous layer and the porous support layer are measured by a method described in paragraph [0077] of WO 2015/012293 A.

From a viewpoint of a handling property during module production, the hollow fiber membrane 111 preferably has a breaking strength of 0.5 N/fil or more and a breaking elongation of 50% or more, more preferably has a breaking strength of 0.8 to 5 N/fil and a breaking elongation of 70 to 400%, even preferably has a breaking strength of 1 to 4 N/fil and a breaking elongation of 140 to 300%.

Incidentally, the breaking strength refers to a value at which the hollow fiber membrane breaks when the hollow fiber membrane is stretched by applying a tensile load in a longitudinal direction of the hollow fiber membrane. "N/fil" is the strength required to break one hollow fiber membrane (1 filament) represented in Newton (N). The breaking elongation refers to elongation until the hollow fiber membrane breaks when the hollow fiber membrane is stretched while applying a tensile load in the longitudinal direction of the hollow fiber membrane.

The breaking strength and the breaking elongation are measured by a method described in paragraph [0081] of WO 2015/012293 A. Specifically, using a Tensilon-type tensile tester, one hollow fiber membrane is held by a chuck portion of the tester so that the length is 2 cm, a tensile load is applied to measure a breaking strength and a breaking elongation three times, and an average value is obtained.

A Gurley bending resistance of the hollow fiber membrane is preferably 15 mN or more, more preferably 15 to 30 mN, and even more preferably 18 to 25 mN. When the Gurley bending resistance of the hollow fiber membrane is equal to or greater than a lower limit of the above range, it is easy to ensure a self-sustaining property of the hollow fiber membrane bundle, and it is easy to suppress a decrease in the efficiency of deaeration or aeration. When the Gurley bending resistance of the hollow fiber membrane is less than or equal to an upper limit of the above range, fewer membranes are in disorder due to an increase in membrane length when the membrane bundle is formed, and the module can be formed in an aligned state.

Incidentally, the Gurley bending resistance of the hollow fiber membrane is measured according to the bending resistance (Gurley) method of the JIS L1096 A method using a sample including seven hollow fiber membrane bundles (width: about 25 to 26 mm) in which the hollow fiber membranes are folded back in units of 32 hollow fiber membranes (32 fil). The Gurley bending resistance of the hollow fiber membrane can be controlled by adjusting the material, the outer diameter, etc. of the hollow fiber membrane.

In the case 112, an inner surface 116c of the case body 116 and the hollow fiber membrane bundle 110 are partially separated, and a gap 128 is formed between the case 112 and the hollow fiber membrane bundle 110 around the hollow fiber membrane bundle 110.

The filling rate of the hollow fiber membrane bundle 110 in the case 112 in a cross section obtained by cutting the case 112 in a direction perpendicular to the length direction of the hollow fiber membrane bundle 110 is preferably 20 to 50%, more preferably 30 to 45%. When the filling rate of the hollow fiber membrane is equal to or greater than a lower limit, it is easy to suppress occurrence of a drift of the to-be-treated liquid in the case. When the filling rate of the hollow fiber membrane is equal to or less than an upper limit, filling of the hollow fiber membrane is facilitated, a pressure loss is reduced, and the performance of deaeration or aeration is improved.

Incidentally, the filling rate is measured as a ratio (%) of a sum of cross-sectional areas of the respective hollow fiber membranes 111 forming the filled hollow fiber membrane bundle 110 to a cross sectional area inside the case 112 in a cross section obtained by cutting the case 112 in the direction perpendicular to the length direction of the hollow fiber membrane bundle 110.

Figure 2:
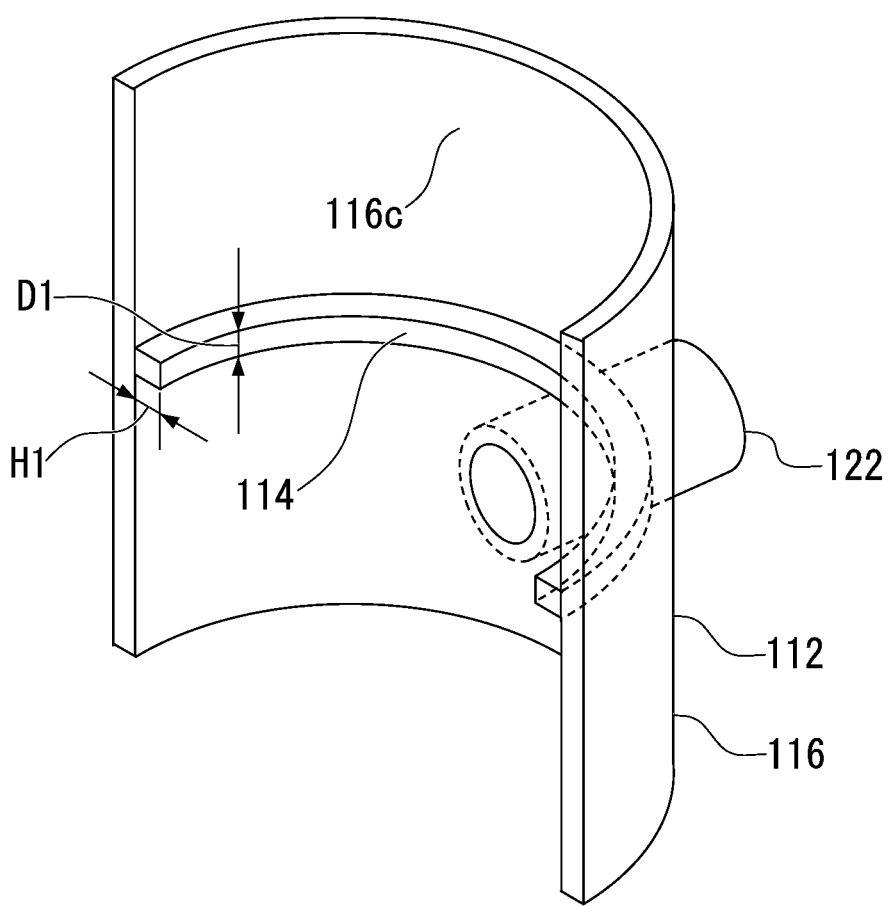
FIG. 2 is an enlarged perspective view of a portion provided with a short-path prevention body of the external circulation-type hollow fiber membrane module of FIG. 1.

In the module 11, as illustrated in FIG. 1 and FIG. 2, the short-path prevention body 114 having an annular shape is provided to fit into the case body 116 of the case 112 and protrude from the inner surface 116c of the case body 116 of the case 112. The short-path prevention body 114 may be formed integrally with the inner surface 116c during molding. A shape of the short-path prevention body 114 is a protrusion that circles around above the inner surface 116c of the case body 116 of the case 112.

The short-path prevention body 114 is provided on a downstream side of the first port 122 in the case 112 and functions to block a flow of the to-be-treated liquid in the gap 128 between the hollow fiber membrane bundle 110 and the case 112. In the module 11, a part of the to-be-treated liquid flowing into the case 112 from the first port 122 enters the hollow fiber membrane bundle 110, and a remaining part attempts to flow downstream through the gap 128 between the hollow fiber membrane bundle 110 and the case 112. However, since the flow of the to-be-treated liquid passing through the gap 128 between the hollow fiber membrane bundle 110 and the case 112 is blocked by the short-path prevention body 114, a direction thereof is changed to the inside in a radial direction, and the to-be-treated liquid flows downstream after entering the hollow fiber membrane bundle 110. In this way, since the to-be-treated liquid passing through the gap 128 between the hollow fiber membrane bundle 110 and the case 112 is guided to the inside of the hollow fiber membrane bundle 110 by the short-path prevention body 114, the to-be-treated liquid is inhibited from flowing out from the third port 120c without being sufficiently processed by flowing through a short path inside the case 112.

The short-path prevention body 114 is preferably provided on the first port 122 side of the second end 110b located on the downstream side in the hollow fiber membrane bundle 110 in a direction along the central axis L11 of the case 112. In addition, from a viewpoint that an effect of inhibiting the to-be-treated liquid from flowing through a short path in the gap 128 between the hollow fiber membrane bundle 110 and the case 112 becomes higher, it is more preferable to provide the short-path prevention body 114 at a position close to the first port 122 as much as possible on the downstream side of the first port 122.

A distance from a position of a central axis L12 of the first port 122 to the second end 110b of the hollow fiber membrane bundle 110 is set to d11 (mm), and a distance from a position of a central axis L12 of the first port 122 to the short-path prevention body 114 is set to d12 (mm) When the first port 122 is a liquid flow-in port, d12/d11 is preferably 0.01 to 0.2, and more preferably 0.03 to 0.1. When d12/d11 is less than or equal to an upper limit, it is possible to eliminate a short-circuit flow passing only outside the hollow fiber membrane bundle. When d12/d11 is greater than or equal to a lower limit, the to-be-treated liquid can be brought into contact with the hollow fiber membrane 111 more efficiently, and the processing capacity of the module 11 is improved.

The module 11 may have an aspect in which the short-path prevention body 114 and the case 112 are separately manufactured and the short-path prevention body 114 is fit into the case 112, or may have an aspect in which the case 112 and the short-path prevention body 114 are integrally formed.

The short-path prevention body 114 of this example has an annular shape surrounding the whole circumference of the hollow fiber membrane bundle 110. Incidentally, the short-path prevention body 114 is not limited to this aspect, and may be intermittently provided around the hollow fiber membrane bundle 110. In the first aspect of the invention, from a viewpoint that an effect of inhibiting the to-be-treated liquid from flowing through a short path in the case is high, it is preferable that the short-path prevention body has the annular shape surrounding the whole circumference of the hollow fiber membrane bundle.

A cross-sectional shape of the short-path prevention body 114 is a rectangular shape in this example. However, the cross-sectional shape is not limited to the rectangular shape, and it is possible to adopt a triangular shape, a semicircular shape, etc.

A width D1 (FIG. 2) of the short-path prevention body 114 in a direction along the central axis L11 is preferably 1 to 10 mm, and more preferably 2 to 7 mm. When the width D1 is equal to or greater than a lower limit, a short-circuit flow that passes outside the membrane bundle can be prevented. When the width D1 is equal to or less than an upper limit, the to-be-treated liquid can be introduced into the membrane bundle more efficiently.

The short-path prevention body 114 needs to be in contact with the hollow fiber membrane bundle 110 in that the to-be-treated liquid can be brought into contact with the hollow fiber membrane 111 more efficiently.

A protrusion height H1 (FIG. 2) of the short-path prevention body 114 from the inner surface 116c of the case body 116 of the case 112 is preferably 1 to 10 mm, and more preferably 2 to 7 mm. When the protrusion height H1 is equal to or greater than the lower limit, the to-be-treated liquid can be brought into contact with the hollow fiber membrane 111 more efficiently, and the processing capacity of the module 11 is improved. When the protrusion height H1 is equal to or less than the upper limit, the hollow fiber membrane bundle 110 can be easily inserted into the short-path prevention body 114.

The number of short-path prevention bodies 114 is one in this example. However, the number is not limited to one and may be two or more. The number of short-path prevention bodies 114 may be set according to the length of the case 112.

From a viewpoint that the effect of inhibiting the to-be-treated liquid from flowing through a short path in the case 112 is higher, it is preferable the short-path prevention body 114 is provided every 50 to 200 mm in the direction along the central axis L11 of the case 112.

A material for forming the short-path prevention body 114 is not particularly limited, and examples thereof include polycarbonate, polysulfone, polyolefin, polyvinyl chloride, acrylic resin, ABS resin, and modified polyphenylene ether. Among these materials, from a viewpoint of having mechanical strength and chemical resistance, the material for forming the short-path prevention body 114 is preferably polyolefin. When the short-path prevention body 114 is formed integrally with the case 112, the material for forming the short-path prevention body 114 is the same as the material for forming the case 112. As the material for forming the short-path prevention body 114, one type may be used alone, or two or more types may be used in combination.

A method of manufacturing the module 11 is not particularly limited. For example, the following method is mentioned.

Figure 3:
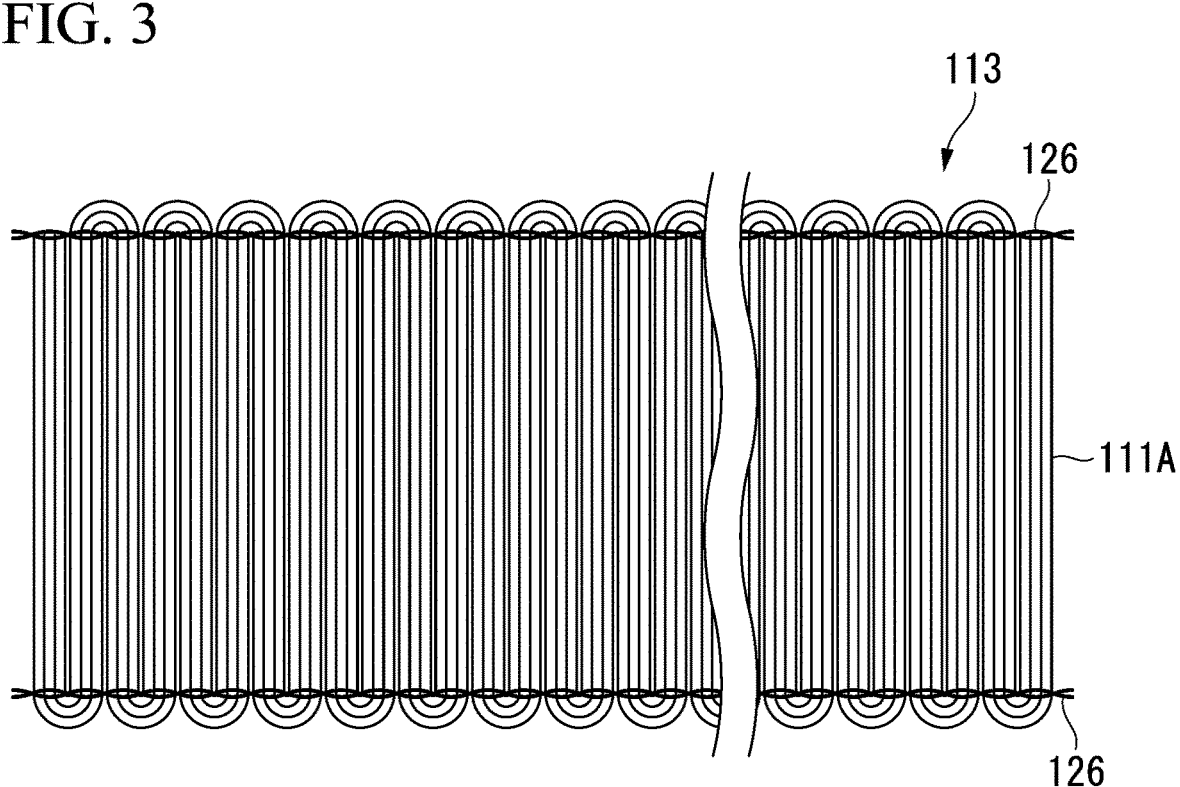
FIG. 3 is a plan view illustrating a process of a method of manufacturing the external circulation-type hollow fiber membrane module of FIG. 1.
Figure 4:
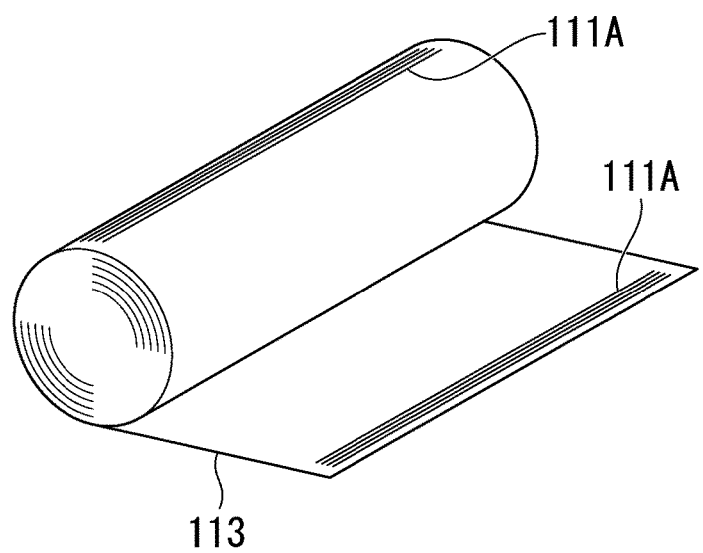
FIG. 4 is a perspective view illustrating a process of the method of manufacturing the external circulation-type hollow fiber membrane module of FIG. 1.
Figure 5:
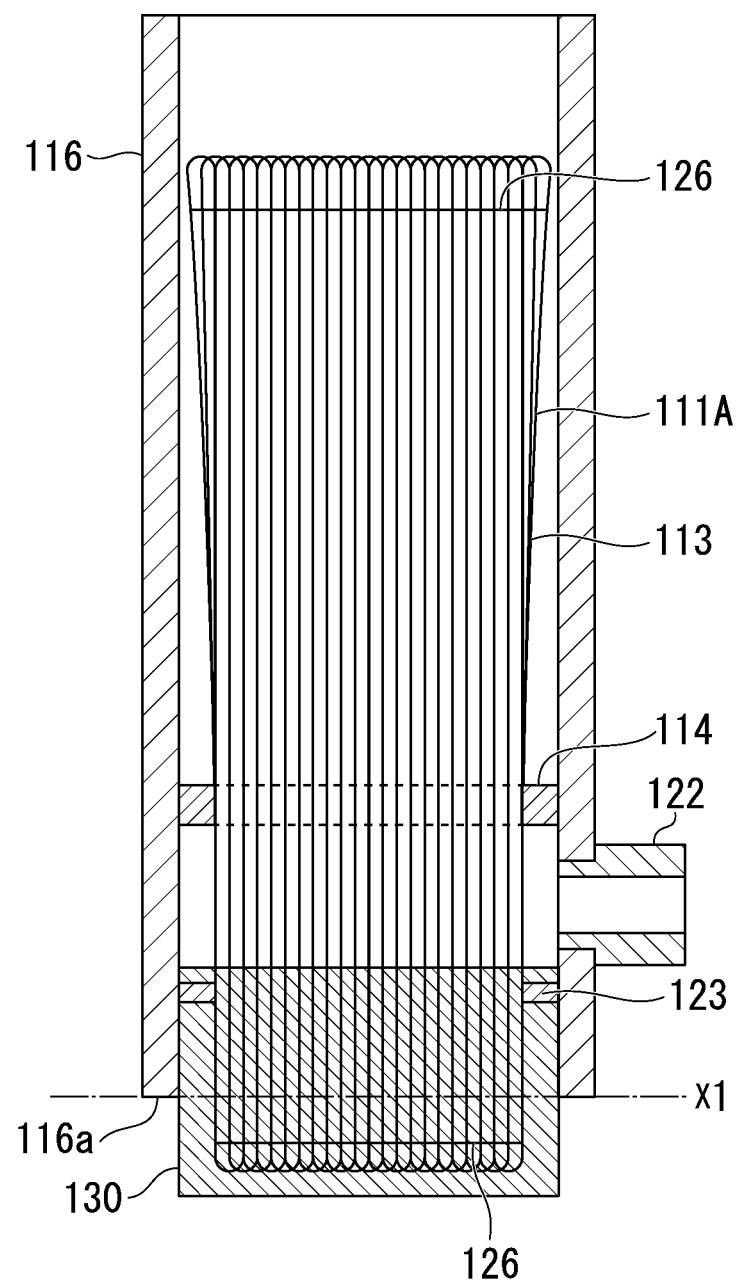
FIG. 5 is a cross-sectional view illustrating a process of the method of manufacturing the external circulation-type hollow fiber membrane module of FIG. 1.

As illustrated in FIG. 3, a long hollow fiber membrane 111A is repeatedly folded back in a U-shape a plurality of times alternately in opposite directions to obtain a belt-like hollow fiber membrane sheet 113. On both end sides in the width direction in the hollow fiber membrane sheet 113, the hollow fiber membrane 111A is knitted in the length direction of the sheet by the warp 126, and portions extending in the width direction in the hollow fiber membrane 111A are connected to each other. Subsequently, as illustrated in FIG. 4, the hollow fiber membrane sheet 113 is wound in a columnar shape so that the width direction of the hollow fiber membrane sheet 113 corresponds to the axial direction. Subsequently, as illustrated in FIG. 5, the hollow fiber membrane sheet 113 wound in the columnar shape is inserted into the case body 116 provided with the short-path prevention body 114 and the restraining ring 123. One end of the hollow fiber membrane sheet 113 is fixed to the first open end 116a side of the case body 116 by a potting resin 130 using a known method such as a centrifugation method. In this instance, a U-turn portion of the hollow fiber membrane 111A on the side of the hollow fiber membrane sheet 113 fixed by the potting resin 130 and a part of the potting resin 130 protrude from the case body 116. Further, the hollow fiber membrane sheet 113 and a protruding portion of the potting resin 130 are cut off by a plane X1 along the first open end 116a of the case body 116. In this way, the columnar hollow fiber membrane bundle 110 fixed to the case body 116 by the potting portion 124 is formed while the open state of the open end 111a of each hollow fiber membrane 111 folded in the U-shape is maintained. Subsequently, the module 11 is obtained by attaching the first lid member 118 and the second lid member 120 to both ends of the case body 116.

In the module 11, the to-be-treated liquid is allowed to flow into the case body 116 of the case 112 from the first port 122, and the to-be-treated liquid is allowed to flow out from the third port 120c. A configuration for allowing the to-be-treated liquid to flow into the case 112 from the first port 122 is not particularly limited. It is possible to adopt a configuration in which the first port 122 is connected to a pump to pump the liquid, or a configuration in which the third port 120c is connected to a pump to draw the to-be-treated liquid.

For example, when the second port 118c is connected to a vacuum pump and evacuated, the dissolved gas of the to-be-treated liquid passing between the respective hollow fiber membranes 111 is taken into the hollow fiber membranes 111 and flows out from the second port 118c, and the to-be-treated liquid is deaerated. In addition, by connecting the second port 118c to an aeration pump to supply gas, gas can be supplied to the to-be-treated liquid passing between the respective hollow fiber membranes 111 through the respective hollow fiber membranes 111.

The to-be-treated liquid flowing in from the first port 122 flows into the hollow fiber membrane bundle 110 while turning around to the opposite side from the first port 122 in the hollow fiber membrane bundle 110 through the gap 128 between the hollow fiber membrane bundle 110 and the case 112 in the case 112. In addition, the to-be-treated liquid flowing downstream through the gap 128 between the hollow fiber membrane bundle 110 and the case 112 is blocked by the short-path prevention body 114, a flow direction changes, and the to-be-treated liquid is guided to the inside of the hollow fiber membrane bundle 110. Further, the to-be-treated liquid passes between the respective hollow fiber membranes 111 in the hollow fiber membrane bundle 110 and flows out from the third port 120c. As described above, in the module 11, the short-path prevention body 114 can inhibit the to-be-treated liquid from flowing through a short path in the gap 128 outside the hollow fiber membrane bundle 110 in the case 112. For this reason, the to-be-treated liquid can be efficiently brought into contact with the hollow fiber membrane 111, and the to-be-treated liquid can be sufficiently processed, so that a module having a high processing capacity is obtained.

As described above, in the external circulation-type hollow fiber membrane module of the first aspect of the invention, the short-path prevention body is provided on the downstream side of the liquid flow-in port in the case, and thus the to-be-treated liquid is inhibited from flowing through a short path in the gap outside the hollow fiber membrane bundle in the case. For this reason, even when the size is increased for the purpose of processing at a high flow rate, the to-be-treated liquid can be efficiently guided to the inside of the hollow fiber membrane bundle and brought into contact with the hollow fiber membrane, and the high processing capacity is obtained. In addition, regardless of the direction of the to-be-treated liquid such as the vertical direction and the horizontal direction, the high processing capacity is obtained. In addition, the external circulation-type hollow fiber membrane module of the first aspect of the invention is easy to manufacture since the high processing capacity is obtained simply by providing the short-path prevention body in the case.

Incidentally, the external circulation-type hollow fiber membrane module of the first aspect of the invention is not limited to the module 11. For example, the external circulation-type hollow fiber membrane module of the first aspect of the invention may correspond to a module in which both the first end and the second end of the hollow fiber membrane bundle in the length direction are fixed to the case by the potting portion. Specifically, the external circulation-type hollow fiber membrane module 12 according to the first aspect of the invention may correspond to an external circulation-type hollow fiber membrane module 12 (hereinafter also referred to as a "module 12") illustrated in FIG. 6.

Figure 6:
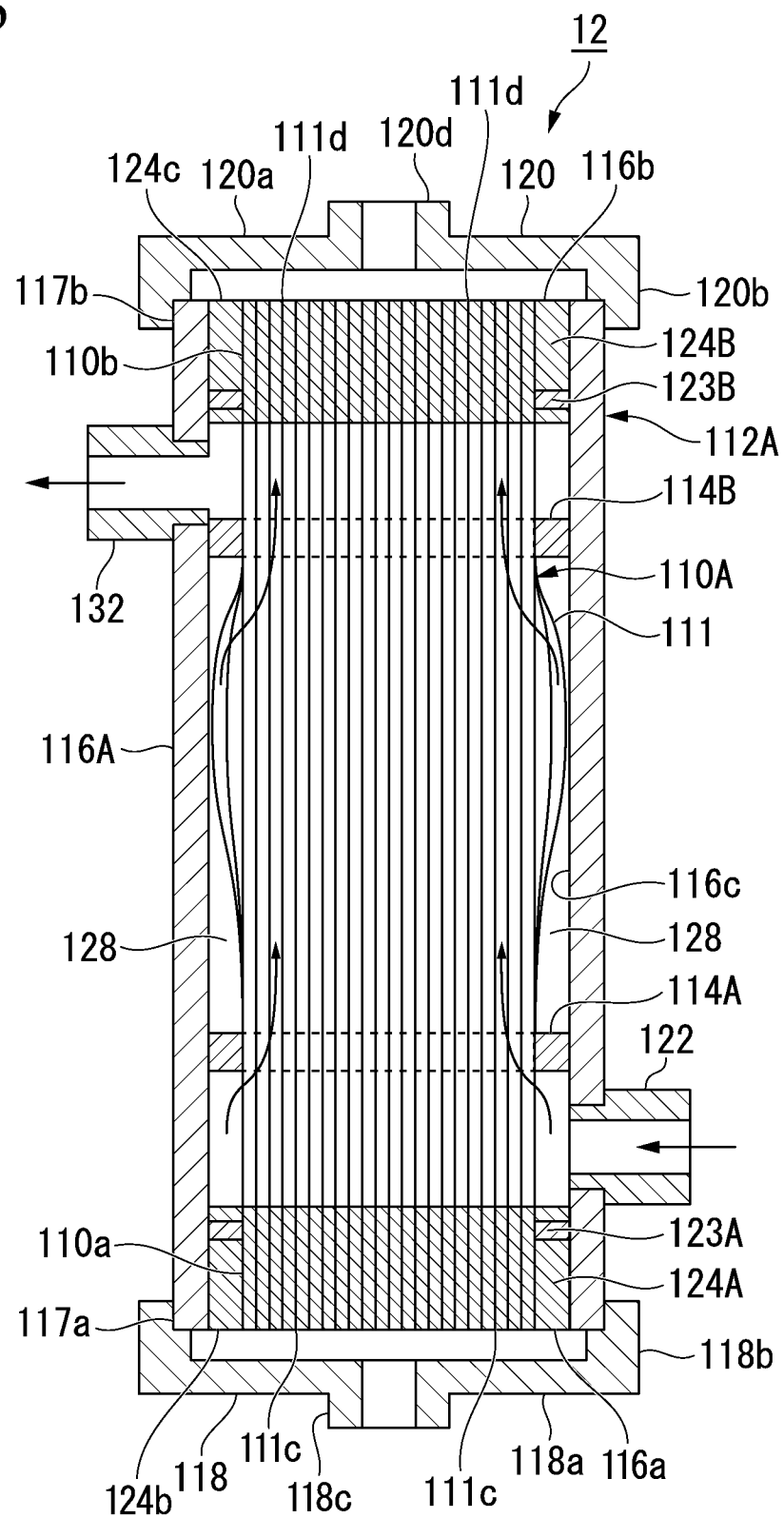
FIG. 6 is a cross-sectional view illustrating another example of the external circulation-type hollow fiber membrane module of the first aspect of the invention.

The same reference symbol will be assigned to the same part of FIG. 6 as that of FIG. 1, and a description thereof will be omitted.

The module 12 includes a hollow fiber membrane bundle 110A, a case 112A, and short-path prevention bodies 114A and 114B.

The case 112A includes a cylindrical case body 116A, a first lid member 118 provided on a first open end 116a side of the case body 116A in the length direction, and a second lid member 120 provided on a second open end 116b side of the case body 116A. A first port 122 is provided at a portion near the first open end 116a in the case body 116A, and a fourth port 132 that functions as a liquid flow-out port or a liquid flow-in port is provided at a portion near the second open end 116b. In the case 112A, the second lid member 120 is provided with a ventilation port 120d instead of the third port 120c.

In this example, the first port 122 is a liquid flow-in port, and the fourth port 132 is a liquid flow-out port. The to-be-treated liquid flowing in from the first port 122 flows in one direction in a length direction of the case 112A toward the fourth port 132, and the flow does not change to a reverse direction in the case 112A. Depending on the installation situation, it is possible to adopt a one-direction water conduction in which the liquid flow is reversed by using the first port 122 as a liquid flow-out port and using the fourth port 132 as a liquid flow-in port.

The hollow fiber membrane bundle 110A is formed by bundling a plurality of hollow fiber membranes 111 in a columnar shape in a state of being aligned in one direction. The hollow fiber membrane bundle 110A is accommodated in the case 112A, and the first end 110*a* and the second end 110*b* of the hollow fiber membrane bundle 110A in the length direction are fixed in the case 112A by potting portions 124A and 124B in a state of being restrained by restraining rings 123A and 12313, respectively. The first port 122 and the fourth port 132 are located between the potting portion 124A and the potting portion 124B in the case 112A.

The first open end 116*a* of the case body 116A is clogged by the potting portion 124A, and the second open end 116*b* of the case body 116A is clogged by the potting portion 124B. On an end surface 124*b* of the potting portion 124A on the first lid member 118 side, an open state of one open end 111*c* of each hollow fiber membrane 111 is maintained. On an end surface 124*c* of the potting portion 124B on the second lid member 120 side, an open state of the other open end 111*d* of each hollow fiber membrane 111 is maintained.

The inner surface 116*c* of the case body 116A and the hollow fiber membrane bundle 110A are partially separated, and a gap 128 is formed outside the hollow fiber membrane bundle 110A in the case 112A.

In the module 12, short-path prevention bodies 114A and 114B are provided on the downstream side of the first port 122 and the upstream side of the fourth port 132 in the case 112A. In the direction along the central axis L11 of the case 112A, the short-path prevention body 114A is provided near the first port 122, and the short-path prevention body 114B is provided near the fourth port 132.

In the module 12, the to-be-treated liquid is allowed to flow into the case 112A from the first port 122, and the to-be-treated liquid is allowed to flow out from the fourth port 132. For example, when the second port 118*c* and the ventilation port 120*d* connected to a vacuum pump and evacuated, the to-be-treated liquid passing between the respective hollow fiber membranes 111 can be deaerated. In addition, by connecting the second port 118*c* and the ventilation port 120*d* to an aeration pump to supply gas, gas can be supplied to the to-be-treated liquid passing between the respective hollow fiber membranes 111.

Even in the module 12, the to-be-treated liquid flowing downstream in the gap 128 between the hollow fiber membrane bundle 110A and the case 112A in the case 112A is blocked by the short-path prevention bodies 114A and 114B, the flow direction changes, and the to-be-treated liquid flows into the hollow fiber membrane bundle 110A. In this way, since the to-be-treated liquid is inhibited from flowing through a short path in the gap 128 outside the hollow fiber membrane bundle 110A in the case 112A, the to-be-treated liquid efficiently comes into contact with the hollow fiber membrane 111, and the processing capacity is improved.

In addition, in the external circulation-type hollow fiber membrane module of the first aspect of the invention, the open end 111*d* of each hollow fiber membrane 111 in the module 12 may be filled with a potting resin, etc. and closed.

Further, in the external circulation-type hollow fiber membrane module of the first aspect of the invention, each hollow fiber membrane forming the hollow fiber membrane bundle may not be folded back in the U-shape, and an open end of the second end may be a free end in a state of being filled with resin, etc. and closed.

[Second Aspect]

An external circulation-type hollow fiber membrane module of a second aspect of the invention includes a hollow fiber membrane bundle in which a plurality of hollow fiber membranes is bundled, and a case in which the hollow fiber membrane bundle is accommodated. At least one end of the hollow fiber membrane bundle in the length direction is fixed in the case by a potting portion with an end surface of each hollow fiber membrane open. In the external circulation-type hollow fiber membrane module of the second aspect of the invention, a hollow fiber membrane having a Gurley bending resistance of 15 mN or more is used.

The external circulation-type hollow fiber membrane module of the second aspect of the invention is a hollow fiber membrane module for removing gas from the to-be-treated liquid or supplying gas to the to-be-treated liquid. The external circulation-type hollow fiber membrane module of the second aspect of the invention can be used as a deaeration module that removes the gas dissolved in the to-be-treated liquid which is circulated outside the membrane of the hollow fiber membrane. The use of the external circulation-type hollow fiber membrane module of the second aspect of the invention is not particularly limited, and examples thereof include an inkjet discharge device such as an inkjet printer or a color filter manufacturing device.

Hereinafter, a description will be given of an example of the external circulation-type hollow fiber membrane module of the second aspect of the invention. Incidentally, dimensions, etc. of drawings illustrated in the following description are merely examples, and the second aspect of the invention is not limited thereto and may be appropriately modified and implemented within a range not changing a gist thereof.

Figure 8:
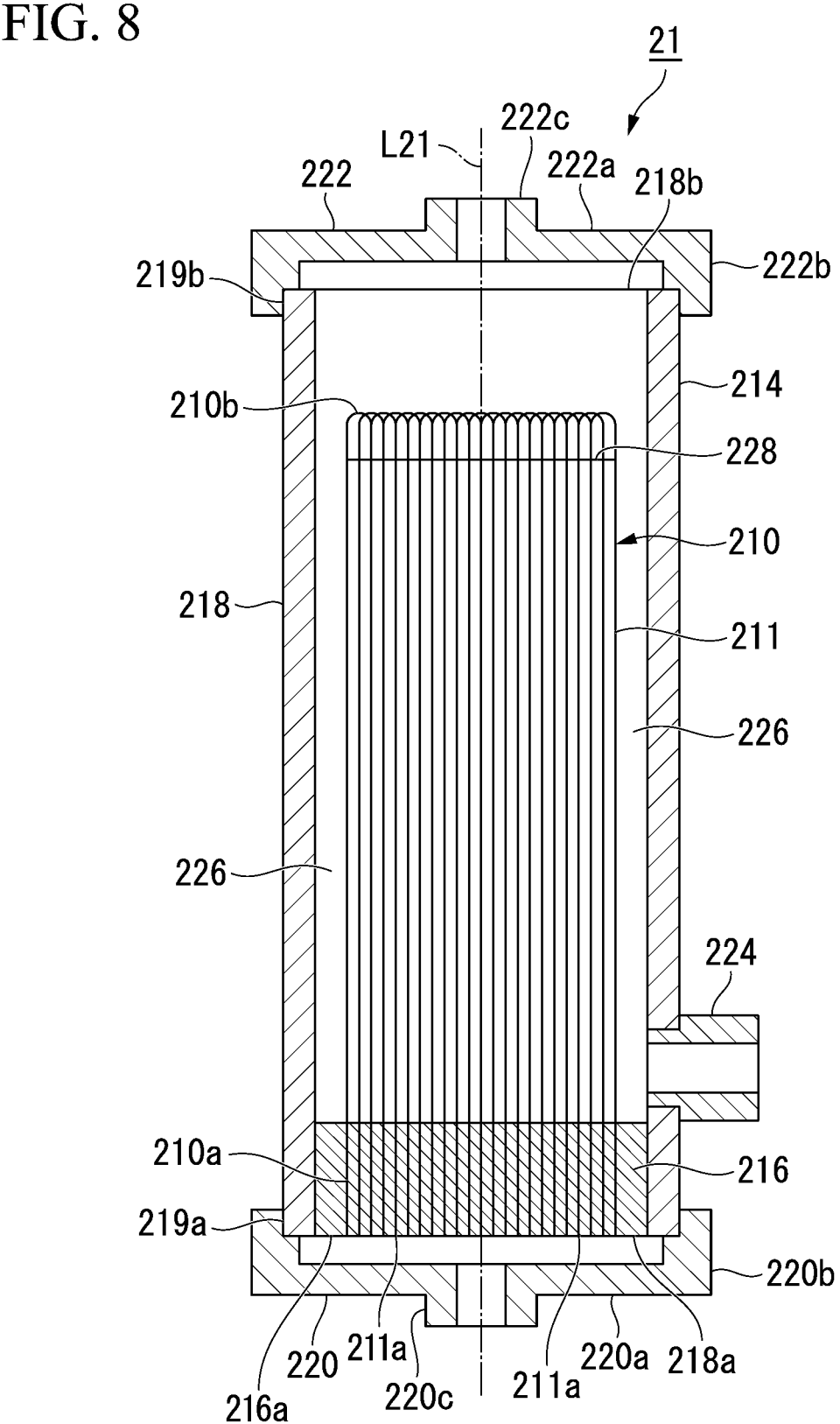
FIG. 8 is a cross-sectional view illustrating an example of an external circulation-type hollow fiber membrane module of a second aspect of the invention.

As illustrated in FIG. 8, an external circulation-type hollow fiber membrane module 21 (hereinafter also referred to as a "module 21") of the present embodiment includes a hollow fiber membrane bundle 210 and a case 214. The hollow fiber membrane bundle 210 is accommodated in the case 214, and a first end 210*a* of the hollow fiber membrane bundle 210 in the length direction is fixed in the case 214 by a potting portion 216. A second end 210*b* on an opposite side from the first end 210*a* in the hollow fiber membrane bundle 210 is a free end.

The case 214 includes a cylindrical case body 218, a first lid member 220 provided on a first open end 218*a* side of the case body 218 in the length direction, and a second lid member 222 provided on a second open end 218*b* side of the case body 218. The case 214 forms a columnar appearance by the case body 218, the first lid member 220, and the second lid member 222.

As the case in the external circulation-type hollow fiber membrane module of the second aspect of the invention, it is preferable to use a case having a columnar appearance which includes a cylindrical case body as in this example. Incidentally, in the second aspect of the invention, the case is not limited to the case having the columnar appearance. For example, it is possible to adopt a case having a polygonal prism-shaped appearance which includes a prismatic case body.

A first port 224 that communicates with the inside of the case body 218 is provided at a portion of the case body 218 of the case 214 near the first open end 218*a* so as to protrude outward from an outer peripheral surface of the case body 218. The first port 224 has a cylindrical shape and functions as a liquid flow-in port that allows the to-be-treated liquid to flow into the case body 218. A shape of the first port 224 is not limited to the cylindrical shape. For example, a prismatic shape, etc. may be adopted.

The first lid member 220 includes a circular flat plate portion 220a, a tube 220b provided to protrude from an outer peripheral edge of the flat plate portion 220a to the case body 218 side over a whole circumference, and a second port 220c provided to protrude to the outside from a central portion of the flat plate portion 220a. A first end 219a of the case body 218 is fit to the tube 220b, and the first lid member 220 is attached to the case body 218. The second port 220c is located on a central axis L21 in the case 214.

The second port 220c has a cylindrical shape, and functions as a gas flow-out port that allows gas to flow out from the case 214 or a gas flow-in port that allows gas to flow in. A shape of the second port 220c is not limited to the cylindrical shape, and may be, for example, a prismatic shape, etc.

The second lid member 222 includes a circular flat plate portion 222a, a tube 222b provided to protrude from an outer peripheral edge of the flat plate portion 222a to the case body 218 side over a whole circumference, and a third port 222c provided to protrude to the outside from a central portion of the flat plate portion 222a. A second end 219b of the case body 218 is fit to the tube 222b, and the second lid member 222 is attached to the case body 218. The third port 222c is located on a central axis L21 in the case 214.

The third port 222c has a cylindrical shape, and functions as a liquid flow-out port that allows the to-be-treated liquid to flow out from the inside of the case 214. A shape of the third port 222c is not limited to the cylindrical shape, and may be, for example, a prismatic shape, etc. In addition, the flat plate portion 222a may be tapered so that bubbles in the case 214 can easily come out.

A material for forming the case 214 is preferably a material that can ensure sufficient mechanical strength and durability. For example, it is possible to use the same material as that mentioned for the case 112 of the first aspect. As the material for forming the case 214, one type may be used alone, or two or more types may be used in combination.

The hollow fiber membrane bundle 210 is formed by bundling a plurality of hollow fiber membranes 211 in a columnar shape. Incidentally, a form of the hollow fiber membrane bundle 210 is not limited to the columnar shape, and may be, for example, a form bundled in a cylindrical shape with a central tube arranged at a center.

The hollow fiber membrane bundle 210 is accommodated in the case body 218 in the case 214, and the first end 210a of the hollow fiber membrane bundle 210 in the length direction is fixed by the potting portion 216 at an end of the case body 218 on the first open end 218a side. Each of the plurality of hollow fiber membranes 211 forming the hollow fiber membrane bundle 210 is bundled in a state of being folded in a U-shape at a center in the length direction, and is buried and fixed in the potting portion 216 in a state in which end surfaces 211a on both sides of each hollow fiber membrane 211 are open.

In the second aspect of the invention, as in this example, it is preferable that each of the plurality of hollow fiber membranes is bundled in a state of being folded in a U-shape at the center in the length direction, and the end surfaces on both sides of each hollow fiber membrane are fixed in the case by the potting portion in an open state. When the respective hollow fiber membranes are bundled in such a state, it becomes easy to sufficiently increase the filling rate of the hollow fiber membrane bundle even when the number of hollow fiber membranes is small, and the production efficiency is improved. Moreover, since it becomes easy to maintain the self-sustaining state of the hollow fiber membrane bundle, the to-be-treated liquid easily spreads between the respective hollow fiber membranes over the entire hollow fiber membrane bundle, and the deaeration efficiency is improved.

The second end 210b including a U-turn portion of each hollow fiber membrane 211 located on the opposite side from the first end 210a in the hollow fiber membrane bundle 210 is not fixed to the case 214 and becomes a free end. In this way, the to-be-treated liquid easily spreads between the respective hollow fiber membranes 211 over the entire hollow fiber membrane bundle 210, and thus the to-be-treated liquid can be deaerated with high efficiency.

The first open end 218a of the case body 218 is clogged by the potting portion 216. An end surface 216a of the potting portion 216 on the first lid member 220 side is flush with the first open end 218a of the case body 218. On the end surface 216a of the potting portion 216, end surfaces 211a on both sides of each hollow fiber membrane 211 are open. A space is formed on the first lid member 220 side of the end surface 216a of the potting portion 216 in the case 214, and the space and a space on the second end 210b side of the hollow fiber membrane bundle 210 with respect to the potting portion 216 in the case body 218 are partitioned by the potting portion 216. When the end surfaces 211a on both sides of each hollow fiber membrane 211 are in an open state, the inside of each hollow fiber membrane 211 communicates with the space on the first lid member 220 side of the potting portion 216 in the case 214.

Both the second port 220c and the third port 222c are located on the central axis L21 in the case 214. Further, an inner wall surface of the case body 218 and the hollow fiber membrane bundle 210 are separated from each other, and a space 226 is formed outside the hollow fiber membrane bundle 210 in the case 214.

In the hollow fiber membrane bundle 210, the respective hollow fiber membranes 211 are bundled in a state of being connected to each other by a warp 228. Specifically, at a portion near the U-turn portion in each hollow fiber membrane 211, the plurality of hollow fiber membranes 211 are woven using the warp 228 in a direction orthogonal to the central axis L21, that is, a direction orthogonal to the length direction of each hollow fiber membrane 211, thereby connecting the mutual hollow fiber membranes 211 to each other. In the second aspect of the invention, it is preferable that the respective hollow fiber membranes are bundled in such a state of being connected to each other using the warp as described above. In this way, it is possible to inhibit the respective hollow fiber membranes 211 forming the hollow fiber membrane bundle 210 from coming loose, and the hollow fiber membrane bundle 210 can easily maintain a self-sustaining state. When a viscosity of the to-be-treated liquid which is circulated is high, in particular, the hollow fiber membranes 211 easily come loose, and it is difficult to ensure the self-sustaining property of the hollow fiber membrane bundle 210. For this reason, an aspect in which the mutual hollow fiber membranes are connected by the warp is particularly effective when the to-be-treated liquid which is circulated has a high viscosity, for example, when the to-be-treated liquid is ink, etc.

An aspect in which a plurality of hollow fiber membranes is connected by a warp is not particularly limited. For example, an aspect of weaving in a chain stitch type can be mentioned.

In the second end 210b of the hollow fiber membrane bundle 210, positions of ends 211b including U-turn portions in the respective hollow fiber membranes 211 are substantially aligned with each other in a direction of the central axis L21 of the case 214. That is, lengths of portions exposed from the potting portion 216 in the respective hollow fiber membrane 211 are aligned with each other. The statement that the positions of the ends 211b of the respective hollow fiber membranes 211 are aligned with each other means that an error of the length of each hollow fiber membrane 211 with respect to an average value of lengths of portions exposed from the potting portion 216 in all the hollow fiber membranes 211 forming the hollow fiber membrane bundle 210 is ±5%.

In the second aspect of the invention, as described above, it is preferable that the ends of the respective hollow fiber membrane bundles are aligned with each other at the second end of the hollow fiber membrane bundle. In this way, it becomes easy to inhibit the to-be-treated liquid from locally unevenly flowing in the case. In addition, the hollow fiber membrane bundle is easily inhibited from being deformed, the to-be-treated liquid easily spreads over the entire hollow fiber membrane bundle, and deaeration efficiency is improved.

An outer diameter of the hollow fiber membrane 211 is preferably 350 μm or less, more preferably 150 to 330 and even more preferably 200 to 300 μm. When the outer diameter of the hollow fiber membrane 211 is equal to or less than an upper limit of the above range, the case can be filled with more hollow fiber membranes, and contact with the to-be-treated liquid becomes more efficient. In addition, a more efficient flow path can be formed between the hollow fiber membranes 211 in the case 214. When the outer diameter of the hollow fiber membrane 211 is equal to or greater than a lower limit of the above range, it is easy to maintain a suitable bending resistance.

An inner diameter of the hollow fiber membrane 211 is preferably 100 μm or more, more preferably 120 to 250 μm, and even more preferably 130 to 200 μm. When the inner diameter of the hollow fiber membrane 211 is within the above range, a sufficient number of hollow fiber membranes 211 can be accommodated in the case 214, and it is easy to maintain deaeration performance and durability.

A membrane thickness of the hollow fiber membrane 211 is preferably 20 to 70 μm, and more preferably 25 to 55 μm. When the membrane thickness of the hollow fiber membrane 211 is equal to or less than the above upper limit, the durability when the inside of the hollow fiber membrane 211 in the case 214 is repeatedly depressurized is excellent. When the membrane thickness of the hollow fiber membrane 211 is equal to or greater than a lower limit of the above range, it is easy to maintain excellent deaeration performance.

Incidentally, a method of calculating the membrane thickness of the hollow fiber membrane and a method of measuring the inner diameter and the outer diameter of the hollow fiber membrane are described in the first aspect.

The Gurley bending resistance of the hollow fiber membrane 211 is preferably 15 mN or more, and more preferably 18 to 25 mN. When the Gurley bending resistance of the hollow fiber membrane 211 is equal to or greater than a lower limit of the above range, it is easy to ensure a shape maintaining property of the hollow fiber membrane bundle, and it is possible to inhibit the shape of the hollow fiber membrane bundle from being disordered and the deaeration efficiency from being lowered. When the Gurley bending resistance of the hollow fiber membrane is less than or equal to an upper limit of the above range, a handling property during module production is suitable.

Incidentally, a method of measuring the Gurley bending resistance of the hollow fiber membrane is described in the first aspect.

In the hollow fiber membrane 211, from a viewpoint of a handling property during module production, it is preferable that the breaking strength is 0.5 N/fil or more and the breaking elongation is 50% or more, it is more preferable that the breaking strength is 0.8 to 5 N/fil and the breaking elongation is 70 to 400%, and it is even more preferable that the breaking strength is 1 to 4 N/fil and the breaking elongation is 140 to 300%.

A method of measuring the breaking strength and the breaking elongation is described in the first aspect.

As the hollow fiber membrane 211, it is preferable to use a hollow fiber membrane having gas permeability that allows gas to pass between a hollow portion in the membrane and the outside of the membrane. In addition, from a viewpoint that strength is excellent and deaeration can be more efficiently performed while suppressing leakage of the to-be-treated liquid, it is more preferable to use, as the hollow fiber membrane 211, a composite hollow fiber membrane that includes a homogeneous layer having gas permeability and a porous support layer supporting the homogeneous layer.

As a structure of the composite hollow fiber membrane, it is preferable to adopt a two-layer structure in which the porous support layer is provided on the inside or the outside of the homogeneous layer or a three-layer structure in which porous support layers are provided on both the inside and the outside of the homogeneous layer, and the three-layer structure is more preferable in terms of strength and deaeration performance.

A material for forming the homogeneous layer is described in the first aspect. The material for forming the homogeneous layer in the second aspect is preferably polyolefin resin and more preferably polyethylene from a viewpoint that deaeration performance is excellent even when the to-be-treated liquid is circulated at a high flow rate and it is easy to ensure the shape maintaining property of the hollow fiber membrane bundle.

The polyolefin resin forming the homogeneous layer in the second aspect preferably has high gas permeability and chemical resistance, and more preferably corresponds to metallocene polyethylene.

A material for forming the porous support layer is as described in the first aspect. From a viewpoint of easily ensuring the shape maintaining property of the hollow fiber membrane bundle, the material for forming the porous support layer in the second aspect preferably corresponds to polyethylene having a high strength and having a melt flow index (MFR) equivalent to that of the homogeneous layer for stability of membrane production.

A pore size of the porous support layer is preferably in a range of 0.01 to 1 μm. When the pore size is equal to or less than an upper limit of the above range, the inside of fine pores (holes through which gas passes) of the homogeneous layer is difficult to get wet, and the homogeneous layer is difficult to deteriorate. When the pore size is equal to or less than a lower limit of the above range, deaeration performance is excellent.

A porosity of the porous support layer is preferably in a range of 30 to 80% by volume. When the porosity is equal to or greater than a lower limit of the above range, the deaeration performance is excellent. When the porosity is equal to or less than an upper limit of the above range, the mechanical strength such as pressure resistance of the hollow fiber membrane is improved.

Thicknesses of the homogeneous layer and the porous support layer may be appropriately set so that the membrane thickness is within the range.

A method of measuring the thicknesses of the homogeneous layer and the porous support layer is described in the first aspect.

A filling rate of the hollow fiber membrane bundle 210 in the case 214 in a cross section obtained by cutting the case 214 in a direction perpendicular to the length direction of the hollow fiber membrane bundle 210 is preferably in a range of 20 to 50%, more preferably in a range of 30 to 45%. When the filling rate of the hollow fiber membrane is equal to or greater than a lower limit, it is easy to suppress occurrence of drift of the to-be-treated liquid in the case. When the filling rate of the hollow fiber membrane is equal to or less than an upper limit, filling of the hollow fiber membrane becomes easy and the deaeration performance is improved.

Incidentally, the filling rate is measured as a ratio (%) of a sum of cross-sectional areas of the respective hollow fiber membranes 211 forming the filled hollow fiber membrane bundle 210 to a cross sectional area inside the case 214 in a cross section obtained by cutting the case 214 in the direction perpendicular to the length direction of the hollow fiber membrane bundle 210.

When the module 21 is used, the to-be-treated liquid is allowed to flow into the case body 218 of the case 214 from the first port 224, and the to-be-treated liquid is allowed to flow out from the third port 222c. In this way, the to-be-treated liquid is circulated outside each hollow fiber membrane 211 in a region on the second end 210b side of the hollow fiber membrane bundle 210 with respect to the potting portion 216 in the case 214. A configuration in which the to-be-treated liquid is allowed to flow in from the first port 224 and flow out from the third port 222c is not particularly limited. For example, it is possible to adopt a configuration in which the first port 224 is connected to a pump to pump the to-be-treated liquid, or a configuration in which the third port 222c is connected to a pump to draw the to-be-treated liquid.

The to-be-treated liquid flowing in from the first port 224 proceeds between the respective hollow fiber membranes 211 toward a center of the hollow fiber membrane bundle 210 while turning around to the opposite side from the first port 224 in the hollow fiber membrane bundle 210 through a space 226 between the hollow fiber membrane bundle 210 and an inner wall surface of the case body 218 in the case 214, and moves to the third port 222c side. When the second port 220c of the first lid member 220 is connected to a vacuum pump and evacuated, the dissolved gas of the to-be-treated liquid passing between the respective hollow fiber membranes 211 is taken into the hollow fiber membranes 211 and flows out from the second port 220c, and thus the to-be-treated liquid can be deaerated.

In the module 21, the hollow fiber membrane bundle 210 is formed by bundling hollow fiber membranes 211 having the outer diameter of 350 µm or less and the Gurley bending resistance of 15 mN or more. In this way, when the hollow fiber membranes 211 excellent in rigidity below a specific outer diameter are bundled, the shape maintaining property of the hollow fiber membrane bundle 210 is excellent. For this reason, even when the module is enlarged so that the hollow fiber membranes 211 are elongated, and the flow rate of the to-be-treated liquid is increased, the hollow fiber membrane bundle 210 is not easily deformed and the shape is not easily disordered, so that the decrease in deaeration performance is suppressed.

A method of manufacturing the module 21 is not particularly limited. For example, the following method can be mentioned.

Figure 9:
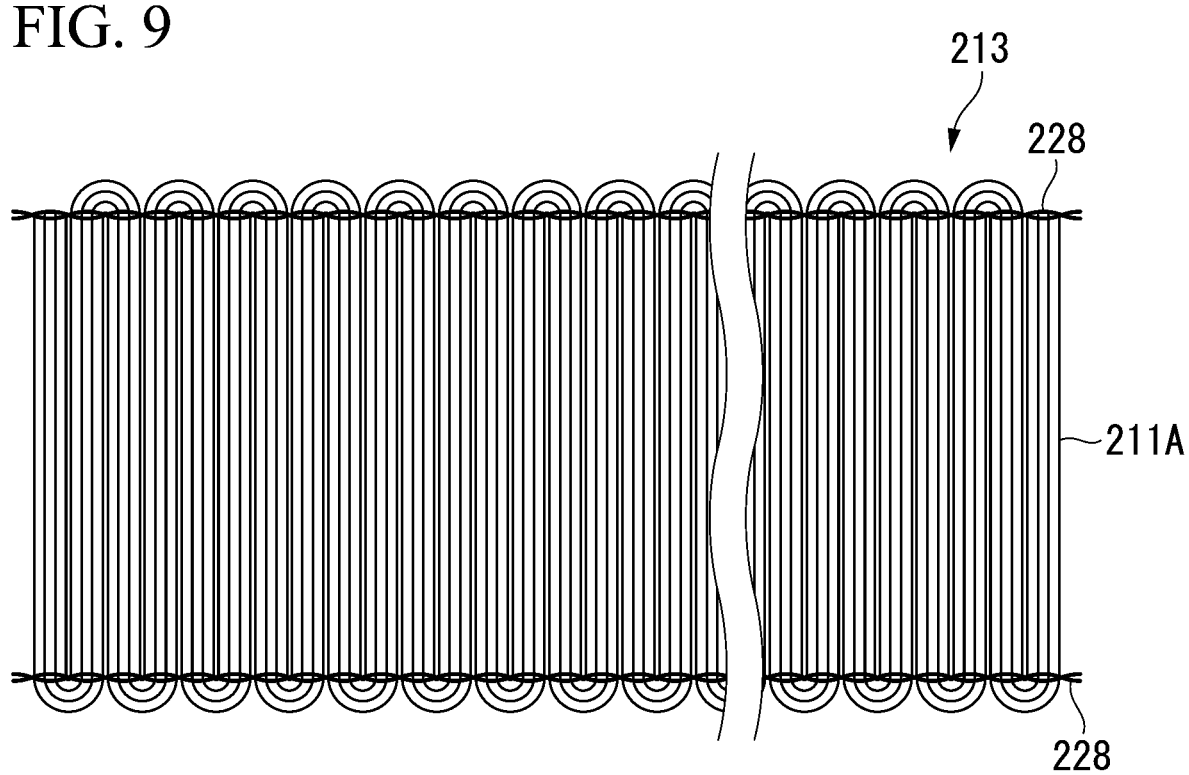
FIG. 9 is a plan view illustrating a process of a method of manufacturing the external circulation-type hollow fiber membrane module of FIG. 8.
Figure 10:
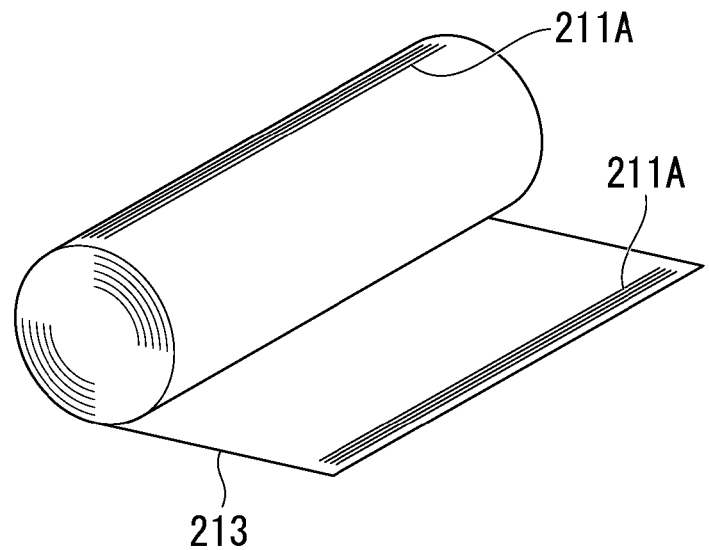
FIG. 10 is a perspective view illustrating a process of the method of manufacturing the external circulation-type hollow fiber membrane module of FIG. 8.
Figure 11:
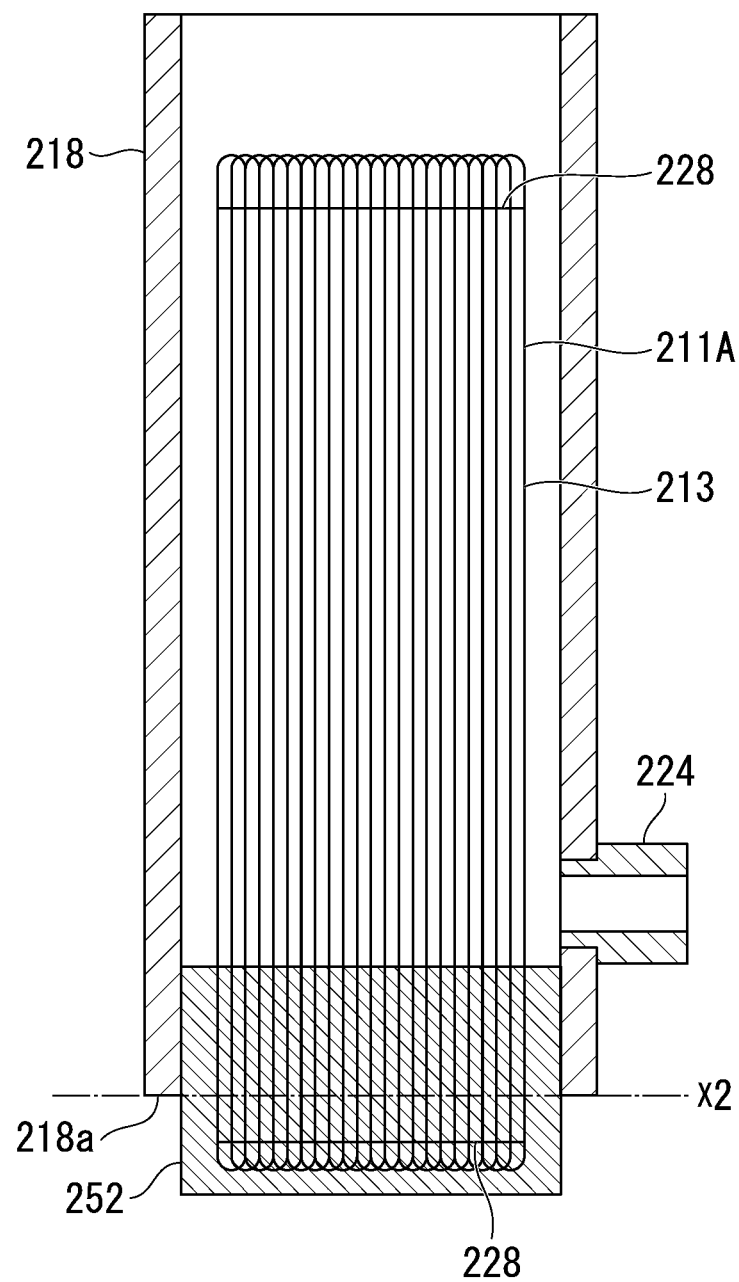
FIG. 11 is a cross-sectional view illustrating a process of the method of manufacturing the external circulation-type hollow fiber membrane module of FIG. 8.

For example, as illustrated in FIG. 9, a long hollow fiber membrane 211A is repeatedly folded back in a U-shape a plurality of times alternately in opposite directions to obtain a belt-like hollow fiber membrane sheet 213. On both end sides in the width direction in the hollow fiber membrane sheet 213, the hollow fiber membrane 211A is knitted in the length direction of the sheet by the warp 228, and portions extending in the width direction in the hollow fiber membrane 211A are connected to each other. Subsequently, as illustrated in FIG. 10, the hollow fiber membrane sheet 213 is wound in a columnar shape so that the width direction of the hollow fiber membrane sheet 213 corresponds to the axial direction. Subsequently, as illustrated in FIG. 11, the hollow fiber membrane sheet 213 wound in the columnar shape is inserted into the case body 218, and one end of the hollow fiber membrane sheet 213 is fixed to the first open end 218a side of the case body 218 by a potting resin 252 using a known method such as a centrifugation method. In this instance, a U-turn portion of the hollow fiber membrane 211A on the side of the hollow fiber membrane sheet 213 fixed by the potting resin 252 and a part of the potting resin 252 protrude from the case body 218. Further, when the hollow fiber membrane sheet 213 and a protruding portion of the potting resin 252 are cut off by a plane X2 along the first open end 218a of the case body 218, the columnar hollow fiber membrane bundle 210 fixed to the case body 218 by the potting portion 216 is formed while the end surface 211a of each hollow fiber membrane 211 folded in the U-shape is open. Subsequently, the module 21 is obtained by attaching the first lid member 220 and the second lid member 222 to both ends of the case body 218.

As explained above, in the external circulation-type hollow fiber membrane module of the second aspect of the invention, the hollow fiber membrane bundle is formed by bundling the hollow fiber membranes having the Gurley bending resistance of 15 mN or more. Using the hollow fiber membranes having excellent rigidity in this way, the shape maintaining property of the hollow fiber membrane bundle can be ensured even when the module is enlarged so that the hollow fiber membranes are elongated. Further, regardless of a direction such as the vertical direction or the horizontal direction in which to-be-treated liquid flows, it is possible to suppress the decrease in deaeration efficiency.

Incidentally, the external circulation-type hollow fiber membrane module of the second aspect of the invention is not limited to the module 21 described above. For example, in the external circulation-type hollow fiber membrane module of the second aspect of the invention, each hollow fiber membrane forming the hollow fiber membrane bundle may not be folded back in the U-shape, and the second end on the opposite side from the first end fixed by the potting portion may correspond to a free end in a state in which an open end thereof is closed by resin, etc.

In the external circulation-type hollow fiber membrane module of the second aspect of the invention, both ends of the hollow fiber membrane bundle in the length direction may be fixed to the case by the potting portion.

Figure 12:
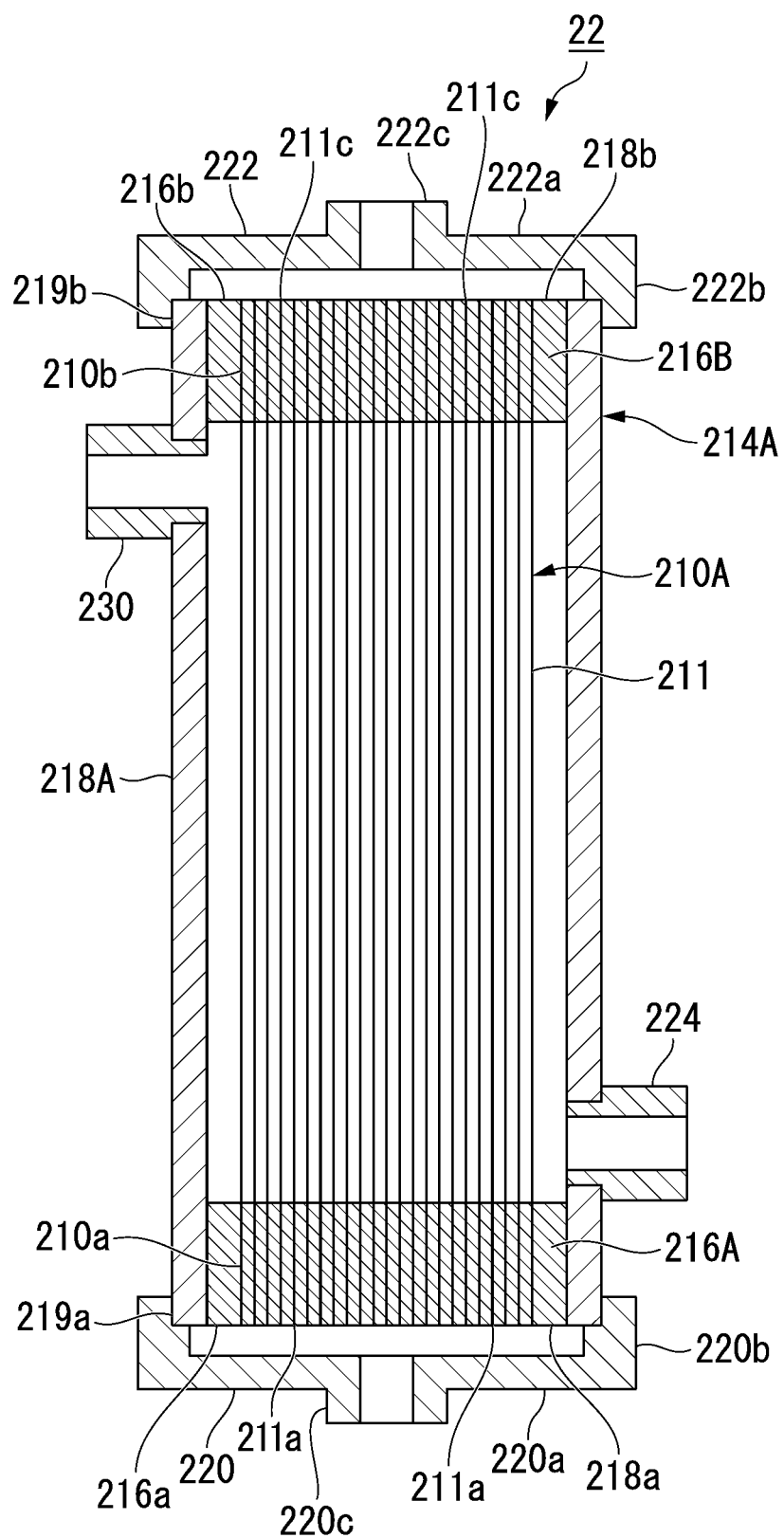
FIG. 12 is a cross-sectional view illustrating another example of the external circulation-type hollow fiber membrane module of the second aspect of the invention.

The external circulation-type hollow fiber membrane module of the second aspect of the invention may correspond to an external circulation-type hollow fiber membrane module 22 (hereinafter also referred to as a "module 22")

illustrated in FIG. 12. The same reference symbol will be assigned to the same part of FIG. 12 as that of FIG. 8, and a description thereof will be omitted.

The module 22 includes a hollow fiber membrane bundle 210A and a case 214A. The hollow fiber membrane bundle 210A is accommodated in the case 214A and fixed in the case 214A by potting portions 216A and 216B at a first end 210a and a second end 210b of the hollow fiber membrane bundle 210A in the length direction, respectively.

The case 214A includes a cylindrical case body 218A, a first lid member 220 provided on a first open end 218a side of the case body 218A in the length direction, and a second lid member 222 provided on a second open end 218b side of the case body 218A. The case 214A forms a columnar appearance by the case body 218A, the first lid member 220, and the second lid member 222.

Similarly to the case 214, a first port 224 that communicates with the inside of the case body 218A is provided at a portion of the case body 218A of the case 214A near the first open end 218a so as to protrude outward from an outer peripheral surface of the case body 218A. In addition, a fourth port 230 that communicates with the inside of the case body 218A is provided at a portion of the case body 218A of the case 214A near the second open end 218b so as to protrude to the opposite side from the first port 224 from the outer peripheral surface of the case body 218A.

A shape of the fourth port 230 is not particularly limited, and examples thereof include a cylindrical shape and a prismatic shape.

The hollow fiber membrane bundle 210A is formed by bundling a plurality of hollow fiber membranes 211 in a columnar shape in a state of being aligned in one direction.

The first open end 218a of the case body 218A is clogged by the potting portion 216A, and the first end 210a of the hollow fiber membrane bundle 210A in the length direction is buried in the potting portion 216A and fixed to a portion on the first open end 218a side in the case body 218A. An end surface 216a of the potting portion 216A on the first lid member 220 side is flush with the first open end 218a of the case body 218A, and an end surface 211a of each hollow fiber membrane 211 on the first open end 218a side is in an open state on the end surface 216a of the potting portion 216A. When the end surface 211a of each hollow fiber membrane 211 on the first open end 218a side is in the open state, the inside of each hollow fiber membrane 211 communicates with a space on the first lid member 220 side of the potting portion 216A in the case 214A.

In addition, the second open end 218b of the case body 218A is clogged by the potting portion 216B, and the second end 210b of the hollow fiber membrane bundle 210A is buried in the potting portion 216B and fixed to a portion on the second open end 218b side in the case body 218A. An end surface 216b of the potting portion 216B on the second lid member 222 side is flush with the second open end 218b of the case body 218A, and an end surface 211c of each hollow fiber membrane 211 on the second open end 218b side is in an open state on the end surface 216b of the potting portion 216B. When the end surface 211c of each hollow fiber membrane 211 on the second open end 218b side is in the open state, the inside of each hollow fiber membrane 211 communicates with a space on the second lid member 222 side of the potting portion 216B in the case 214A.

An inner wall surface of the case body 218A and the hollow fiber membrane bundle 210A are separated from each other, and a space 226 is formed outside the hollow fiber membrane bundle 210A in the case 214A.

When the module 22 is used, for example, the to-be-treated liquid is allowed to flow into the case body 218A of the case 214A from the first port 224, and the to-be-treated liquid is allowed to flow out from the fourth port 230. In this way, the to-be-treated liquid is circulated to the outside of each hollow fiber membrane 211 in a region between the potting portion 216A and the potting portion 216B in the case 214A. Further, when a second port 220c of the first lid member 220 and a third port 222c of the second lid member 222 are connected to a vacuum pump and evacuated, the dissolved gas of the to-be-treated liquid passing between the respective hollow fiber membranes 211 is taken into the hollow fiber membranes 211 and flows out from the second port 220c and the third port 222c, and thus the to-be-treated liquid can be deaerated.

In the module 22, the hollow fiber membranes 211 having the Gurley bending resistance of 15 mN or more are bundled to form the hollow fiber membrane bundle 210A. As described above, the hollow fiber membranes 211 having excellent rigidity below a specific outer diameter are bundled, so that the shape maintaining property of the hollow fiber membrane bundle 210A is excellent. For this reason, during manufacture or during use, the hollow fiber membrane bundle 210A is not easily deformed and the shape is not easily disordered, so that the decrease in deaeration performance is suppressed.

[Third Aspect]

An external circulation-type hollow fiber membrane module of a third aspect of the invention includes a hollow fiber membrane bundle in which a plurality of hollow fiber membranes is bundled in a tubular shape so that a cavity is formed inside, and a case in which the hollow fiber membrane bundle is accommodated. A first end of the hollow fiber membrane bundle in the length direction is fixed in the case by a potting portion in a state in which an end surface of each hollow fiber membrane is open, and a second end on the opposite side from the first end in the hollow fiber membrane bundle is a free end. In the external circulation-type hollow fiber membrane module of the third aspect of the invention, only the hollow fiber membrane bundle is provided in a region between the potting portion and the second end of the hollow fiber membrane bundle in the case.

The external circulation-type hollow fiber membrane module of the third aspect of the invention can be used as a module for deaeration which removes gas dissolved in liquid to be externally circulated or a module for aeration which supplies gas into liquid to be externally circulated. The use of the external circulation-type hollow fiber membrane module of the third aspect of the invention is not particularly limited, and examples thereof include an inkjet discharge device such as an inkjet printer or a color filter manufacturing device.

Hereinafter, a description will be given of an example of the external circulation-type hollow fiber membrane module of the third aspect of the invention. Incidentally, dimensions, etc. of drawings illustrated in the following description are merely examples, and the third aspect of the invention is not limited thereto and may be appropriately modified and implemented within a range not changing a gist thereof.

Figure 14:
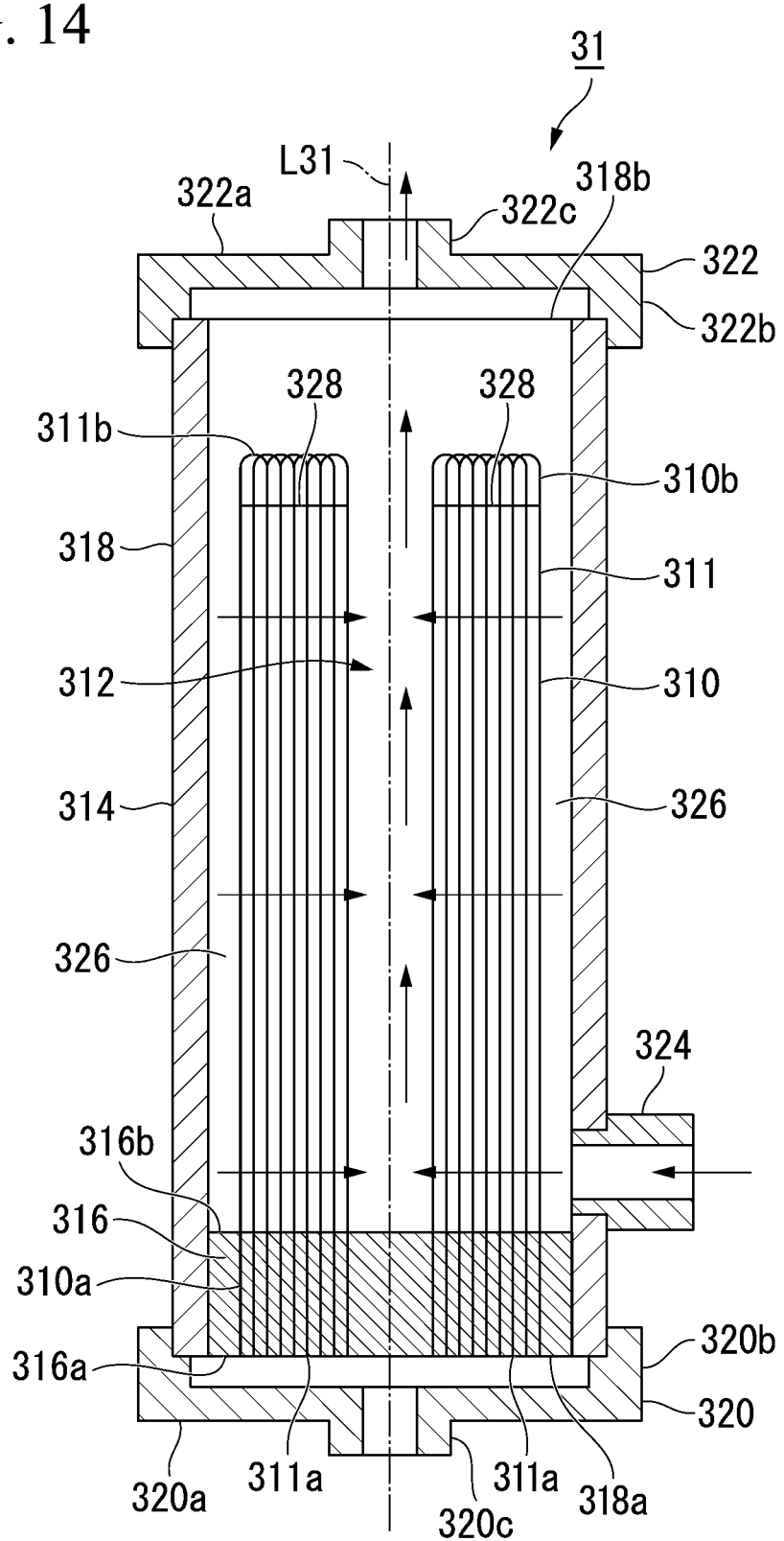
FIG. 14 is a cross-sectional view illustrating an example of an external circulation-type hollow fiber membrane module of a third aspect of the invention.

As illustrated in FIG. 14, an external circulation-type hollow fiber membrane module 31 (hereinafter also referred to as a "module 31") of the third aspect of the present embodiment includes a hollow fiber membrane bundle 310 and a case 314. The hollow fiber membrane bundle 310 is accommodated in the case 314, and a first end 310a of the hollow fiber membrane bundle 310 in the length direction is fixed in the case 314 by a potting portion 316. A second end 310b on an opposite side from the first end 310a in the hollow fiber membrane bundle 310 is a free end.

The case 314 includes a cylindrical case body 318, a first lid member 320 provided on a first open end 318a side of the case body 318 in the length direction, and a second lid member 322 provided on a second open end 318b side of the case body 318. The case 314 forms a columnar appearance by the case body 318, the first lid member 320, and the second lid member 322.

As the case in the external circulation-type hollow fiber membrane module of the third aspect of the invention, it is preferable to use a case having a columnar appearance which includes a cylindrical case body as in this example. Incidentally, in the third aspect of the invention, the case is not limited to the case having the columnar appearance. For example, it is possible to adopt a case having a polygonal prism-shaped appearance which includes a prismatic case body.

A first port 324 that communicates with the inside of the case body 318 is provided at a portion of the case body 318 of the case 314 near the first open end 318a so as to protrude outward from an outer peripheral surface of the case body 318. The first port 324 has a cylindrical shape and functions as a liquid inflow and flow-out port that allows the to-be-treated liquid to flow into and out of the case body 318. A shape of the first port 324 is not limited to the cylindrical shape. For example, a prismatic shape, etc. may be adopted.

The first lid member 320 includes a circular flat plate portion 320a, a tube 320b provided to protrude from an outer peripheral edge of the flat plate portion 320a to the case body 318 side over a whole circumference, and a second port 320c provided to protrude to the outside from a central portion of the flat plate portion 320a. A first end 319a of the case body 318 is fit to the tube 320b, and the first lid member 320 is attached to the case body 318. The second port 320c is located on a central axis L31 in the case 314.

The second port 320c has a cylindrical shape, and functions as a gas flow-out port that allows gas to flow out from the case 314 or a gas flow-in port that allows gas to flow in. A shape of the second port 320c is not limited to the cylindrical shape, and may be, for example, a prismatic shape, etc.

The second lid member 322 includes a circular flat plate portion 322a, a tube 322b provided to protrude from an outer peripheral edge of the flat plate portion 322a to the case body 318 side over a whole circumference, and a third port 322c provided to protrude to the outside from a central portion of the flat plate portion 322a. A second end 319b of the case body 318 is fit to the tube 322b, and the second lid member 322 is attached to the case body 318. The third port 322c is located on a central axis L31 in the case 314.

The third port 322c has a cylindrical shape, and functions as a liquid inflow and flow-out port that allows the liquid to flow into and out of the case 314. A shape of the third port 322c is not limited to the cylindrical shape, and may be, for example, a prismatic shape, etc. The flat plate portion 322a may be tapered so that bubbles in the case 314 can easily come out.

A size of the case 314 can be set as appropriate. For example, when the cylindrical case body 318 is included, an outer diameter of the case body 318 can be 3 to 15 cm and the length can be 5 to 50 cm. However, the outer diameter and length of the case body 318 can be changed as appropriate.

A material for forming the case 314 is preferably a material that can ensure sufficient mechanical strength and durability. For example, it is possible to use the same material as that mentioned for the case 112 of the first aspect. As the material for forming the case 314, one type may be used alone, or two or more types may be used in combination.

Figure 15:
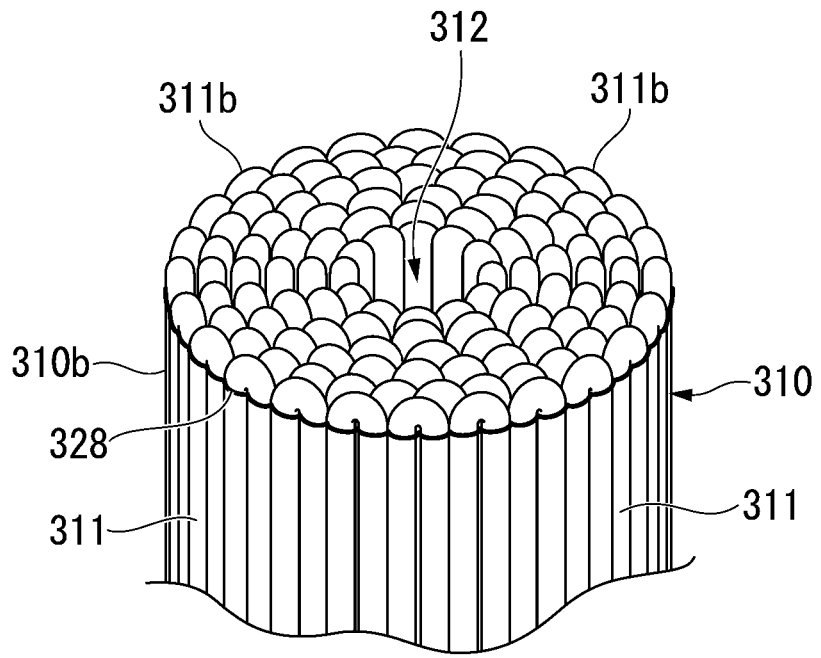
FIG. 15 is a perspective view illustrating an upper part of a hollow fiber membrane bundle in the external circulation-type hollow fiber membrane module of FIG. 14.

As illustrated in FIG. 14 and FIG. 15, the hollow fiber membrane bundle 310 is formed by bundling a plurality of hollow fiber membranes 311 in a cylindrical shape so that a cavity 312 is formed inside. A shape of the hollow fiber membrane bundle 310 is preferably a cylindrical shape as in this example. Incidentally, the shape of the hollow fiber membrane bundle 310 is not limited to the cylindrical shape, and may be an elliptical cylindrical shape, a square shape, etc.

The hollow fiber membrane bundle 310 is accommodated in the case body 318 in the case 314, and the first end 310a of the hollow fiber membrane bundle 310 in the length direction is fixed by the potting portion 316 at an end of the case body 318 on the first open end 318a side. Each of the plurality of hollow fiber membranes 311 forming the hollow fiber membrane bundle 310 is bundled in a state of being folded in a U-shape at a center in the length direction, and is buried and fixed in the potting portion 316 in a state in which end surfaces 311a on both sides of each hollow fiber membrane 311 are open.

In the third aspect of the invention, as in this example, it is preferable that each of the plurality of hollow fiber membranes is bundled in a state of being folded in a U-shape at the center in the length direction, and the end surfaces on both sides of each hollow fiber membrane are fixed in the case by the potting portion in an open state. When the respective hollow fiber membranes are bundled in such a state, it becomes easy to sufficiently increase the filling rate of the hollow fiber membrane bundle even when the number of hollow fiber membranes is small, and the production efficiency is improved. Moreover, since it becomes easy to maintain the self-sustaining state of the hollow fiber membrane bundle, the liquid easily spreads between the respective hollow fiber membranes over the entire hollow fiber membrane bundle, and the deaeration or aeration efficiency is improved.

The second end 310b including a U-turn portion of each hollow fiber membrane 311 located on the opposite side from the first end 310a in the hollow fiber membrane bundle 310 is not fixed to the case 314 and becomes a free end. In this way, the to-be-treated liquid easily spreads between the respective hollow fiber membranes 311 over the entire hollow fiber membrane bundle 310, and thus the liquid can be deaerated or aerated with high efficiency.

The first open end 318a of the case body 318 is clogged by the potting portion 316. An end surface 316a of the potting portion 316 on the first lid member 320 side is flush with the first open end 318a of the case body 318. On the end surface 316a of the potting portion 316, the end surfaces 311a on both sides of each hollow fiber membrane 311 are open. A space is formed on the first lid member 320 side of the end surface 316a of the potting portion 316 in the case 314, and the space and a space on the second end 310b side of the hollow fiber membrane bundle 310 with respect to the potting portion 316 in the case body 318 are partitioned by the potting portion 316. When the end surfaces 311a on both sides of each hollow fiber membrane 311 are in an open state, the inside of each hollow fiber membrane 311 communicates with the space on the first lid member 320 side of the potting portion 316 in the case 314.

In the hollow fiber membrane bundle 310 accommodated in the case 314, each hollow fiber membrane 311 is bundled in a cylindrical shape so as to surround a central axis L31 of the case 314, and the columnar cavity 312 is formed inside the hollow fiber membrane bundle 310. The cavity 312, the second port 320c, and the third port 322c are all located on the central axis L31 in the case 314. Further, an inner wall surface of the case body 318 and the hollow fiber membrane bundle 310 are separated from each other, and a space 326 is formed outside the hollow fiber membrane bundle 310 in the case 314.

In the module 31, only the hollow fiber membrane bundle 310 is provided in a region between the end surface 316b of the potting portion 316 on the second end 310b side of the hollow fiber membrane bundle 310 and the second end 310b of the hollow fiber membrane bundle 310 in the case 314. That is, nothing is arranged in the cavity 312 inside the cylindrical hollow fiber membrane bundle 310. Accordingly, over the entire hollow fiber membrane bundle 310, the liquid passing between the respective hollow fiber membranes 311 moves without being blocked between the space 326 outside the cylindrical hollow fiber membrane bundle 310 and the cavity 312 inside the hollow fiber membrane bundle 310.

In the hollow fiber membrane bundle 310, the hollow fiber membranes 311 may be bundled in a state of being connected to each other by a warp 328. Specifically, at a portion near the U-turn portion in each hollow fiber membrane 311, the plurality of hollow fiber membranes 311 are woven using the warp 328 in a direction orthogonal to the central axis L31, that is, a direction orthogonal to the length direction of each hollow fiber membrane 311, thereby connecting the mutual hollow fiber membranes 311 to each other. In the third aspect of the invention, it is preferable that the respective hollow fiber membranes are bundled in such a state of being connected to each other using the warp as described above. In this way, it is possible to inhibit the respective hollow fiber membranes 311 forming the hollow fiber membrane bundle 310 from coming loose, and the hollow fiber membrane bundle 310 can easily maintain a self-sustaining state. When a viscosity of the liquid which is circulated is high, in particular, the hollow fiber membranes 311 easily come loose, and it is difficult to ensure the self-sustaining property of the hollow fiber membrane bundle 310. For this reason, an aspect in which the mutual hollow fiber membranes are connected by the warp is particularly effective when the liquid which is circulated has a high viscosity, for example, when the liquid is ink, etc.

An aspect in which a plurality of hollow fiber membranes is connected by a warp is not particularly limited. For example, an aspect of weaving in a chain stitch type can be mentioned.

In the second end 310b of the hollow fiber membrane bundle 310, positions of ends 311b including U-turn portions in the respective hollow fiber membranes 311 are substantially aligned with each other in a direction of the central axis L31 of the case 314. That is, lengths of portions exposed from the potting portion 316 in the respective hollow fiber membrane 311 are aligned with each other. The statement that the positions of the ends 311b of the respective hollow fiber membranes 311 are aligned with each other means that an error of the length of each hollow fiber membrane 311 with respect to an average value of lengths of portions exposed from the potting portion 316 in all the hollow fiber membranes 311 forming the hollow fiber membrane bundle 310 is ±5%.

In the third aspect of the invention, as described above, it is preferable that the ends of the respective hollow fiber membrane bundles are aligned with each other at the second end of the hollow fiber membrane bundle. In this way, it becomes easy to inhibit the liquid from locally unevenly flowing in the case. In addition, the hollow fiber membrane bundle is easily inhibited from being deformed, the liquid easily spreads over the entire hollow fiber membrane bundle, and deaeration or aeration efficiency is improved.

As the hollow fiber membrane 311, it is preferable to use a hollow fiber membrane having gas permeability that allows gas to pass between a hollow portion in the membrane and the outside of the membrane. In addition, from a viewpoint that strength is excellent and deaeration or aeration can be more efficiently performed, it is more preferable to use, as the hollow fiber membrane 311, a composite hollow fiber membrane that includes a homogeneous layer having gas permeability and a porous support layer supporting the homogeneous layer.

As a structure of the composite hollow fiber membrane, it is preferable to adopt a two-layer structure in which the porous support layer is provided on the inside or the outside of the homogeneous layer or a three-layer structure in which porous support layers are provided on both the inside and the outside of the homogeneous layer, and the three-layer structure is more preferable in terms of strength and deaeration or aeration performance.

A material for forming the homogeneous layer is described in the first aspect. The material for forming the homogeneous layer in the third aspect is preferably polyolefin resin from a viewpoint that deaeration or aeration performance is excellent even when the liquid is circulated at a high flow rate and chemical resistance is excellent, and more preferably low-density polyethylene since a film production property is excellent.

A material for forming the porous support layer is described in the first aspect. From a viewpoint of easily ensuring the self-sustaining property of the hollow fiber membrane bundle, high-density polyethylene that exhibits an MFR value equivalent to that of the homogeneous layer is preferably used as the material for forming the homogeneous layer in the third aspect.

A pore size of the porous support layer is preferably in a range of 0.01 to 1 µm.

A porosity of the porous support layer is preferably in a range of 30 to 80% by volume. When the porosity is equal to or greater than a lower limit of the above range, deaeration or aeration performance is excellent. When the porosity is equal to or less than an upper limit of the above range, the mechanical strength such as pressure resistance of the hollow fiber membrane is improved.

An outer diameter of the hollow fiber membrane 311 is preferably 350 µm or less, more preferably 150 to 330 µm, and even more preferably 200 to 300 µm. When the outer diameter of the hollow fiber membrane 311 is within the above range, a more efficient flow path can be formed between the hollow fiber membranes 311 in the case 314.

An inner diameter of the hollow fiber membrane 311 is preferably 100 µm or more, more preferably 120 to 250 µm, and even more preferably 130 to 200 µm. When the inner diameter of the hollow fiber membrane 311 is within the above range, a sufficient number of hollow fiber membranes 311 can be accommodated in the case 314, and the performance of deaeration or aeration and durability can be easily maintained.

A membrane thickness of the hollow fiber membrane 311 is preferably 20 to 70 µm, and more preferably 25 to 55 µm. When the membrane thickness of the hollow fiber membrane 311 is equal to or less than the upper limit, the durability when the inside of the hollow fiber membrane 311 in the case 314 is repeatedly depressurized or pressurized is excellent. When the membrane thickness of the hollow fiber membrane 311 is equal to or greater than a lower limit of the above range, it is easy to maintain excellent performance of deaeration or aeration.

Incidentally, a method of calculating the membrane thickness of the hollow fiber membrane and a method of measuring the inner diameter and the outer diameter of the hollow fiber membrane are described in the first aspect.

Thicknesses of the homogeneous layer and the porous support layer may be appropriately set so that the membrane thickness is within the range. The thickness of the homogeneous layer is preferably in a range of 0.3 to 2 μm, more preferably in a range of 0.5 to 1.2 μm.

A method of measuring the thicknesses of the homogeneous layer and the porous support layer is described in the first aspect.

From a viewpoint of a handling property during module production, the hollow fiber membrane 311 preferably has a breaking strength of 0.5 N/fil or more and a breaking elongation of 50% or more, more preferably has a breaking strength of 0.8 to 5 N/fil and a breaking elongation of 70 to 400%, even preferably has a breaking strength of 1 to 4 N/fil and a breaking elongation of 140 to 300%.

A method of measuring the breaking strength and the breaking elongation is described in the first aspect.

The filling rate of the hollow fiber membrane bundle 310 in the case 314 in a cross section obtained by cutting the case 314 in a direction perpendicular to the length direction of the hollow fiber membrane bundle 310 is preferably 20 to 50%, more preferably 30 to 45%. When the filling rate of the hollow fiber membrane is equal to or greater than a lower limit, it is easy to suppress occurrence of a drift of the liquid in the case. When the filling rate of the hollow fiber membrane is equal to or less than an upper limit, filling of the hollow fiber membrane is facilitated, and the performance of deaeration or aeration is improved.

Incidentally, the filling rate is measured as a ratio (%) of a sum of cross-sectional areas of the respective hollow fiber membranes 311 forming the filled hollow fiber membrane bundle 310 to a cross sectional area inside the case 314 in a cross section obtained by cutting the case 314 in the direction perpendicular to the length direction of the hollow fiber membrane bundle 310.

A Gurley bending resistance of the hollow fiber membrane is preferably 10 mN or more, more preferably 15 to 30 mN, and even more preferably 18 to 25 mN. When the Gurley bending resistance of the hollow fiber membrane is equal to or greater than a lower limit of the above range, it is easy to ensure a self-sustaining property of the hollow fiber membrane bundle, and it is easy to suppress a decrease in the efficiency of deaeration or aeration. When the Gurley bending resistance of the hollow fiber membrane is less than or equal to an upper limit of the above range, fewer membranes are in disorder due to an increase in membrane length when the membrane bundle is formed, and the module can be formed in an aligned state.

Incidentally, a method of measuring the Gurley bending resistance of the hollow fiber membrane is described in the first aspect.

A method of manufacturing the module 31 is not particularly limited. For example, the following method is mentioned.

Figure 16:
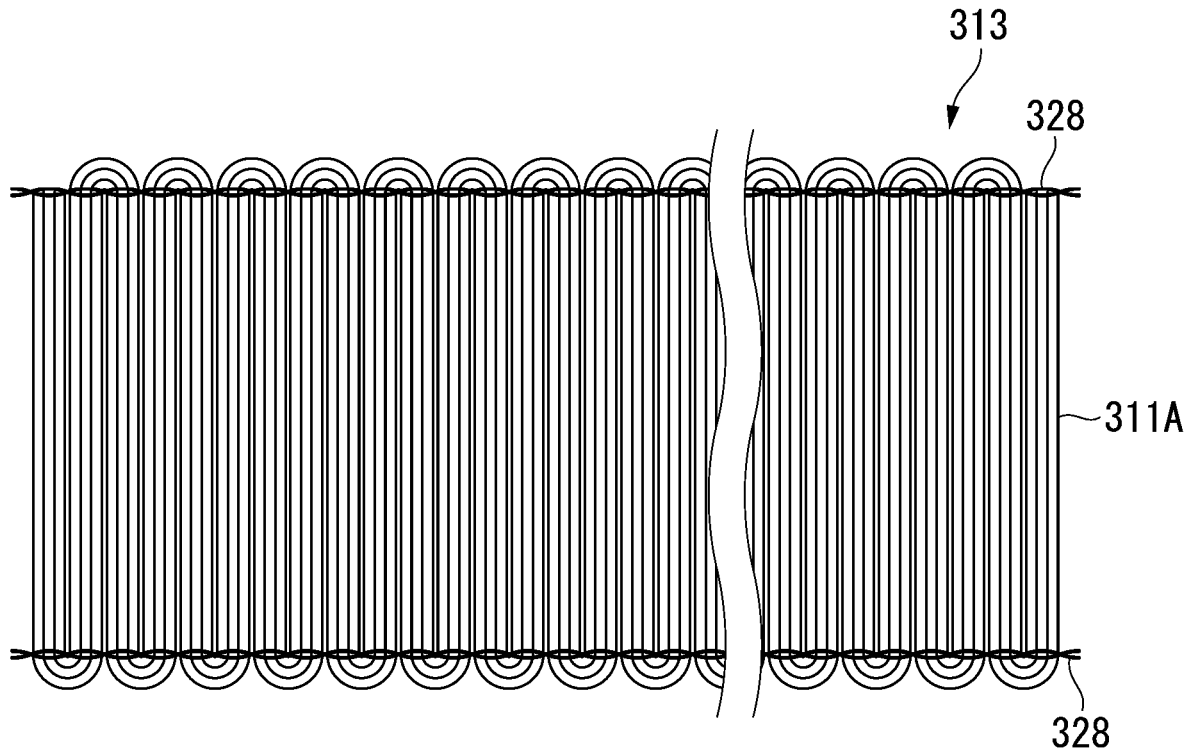
FIG. 16 is a plan view illustrating a process of a method of manufacturing the external circulation-type hollow fiber membrane module of FIG. 14.
Figure 17:
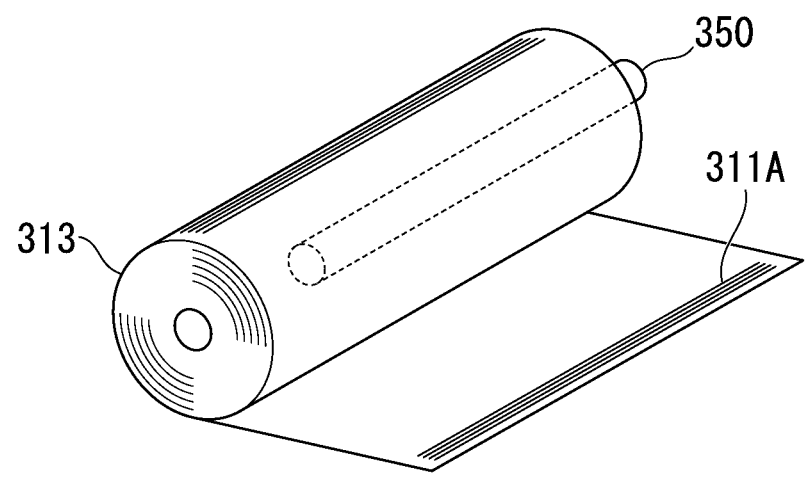
FIG. 17 is a perspective view illustrating a process of the method of manufacturing the external circulation-type hollow fiber membrane module of FIG. 14.
Figure 18:
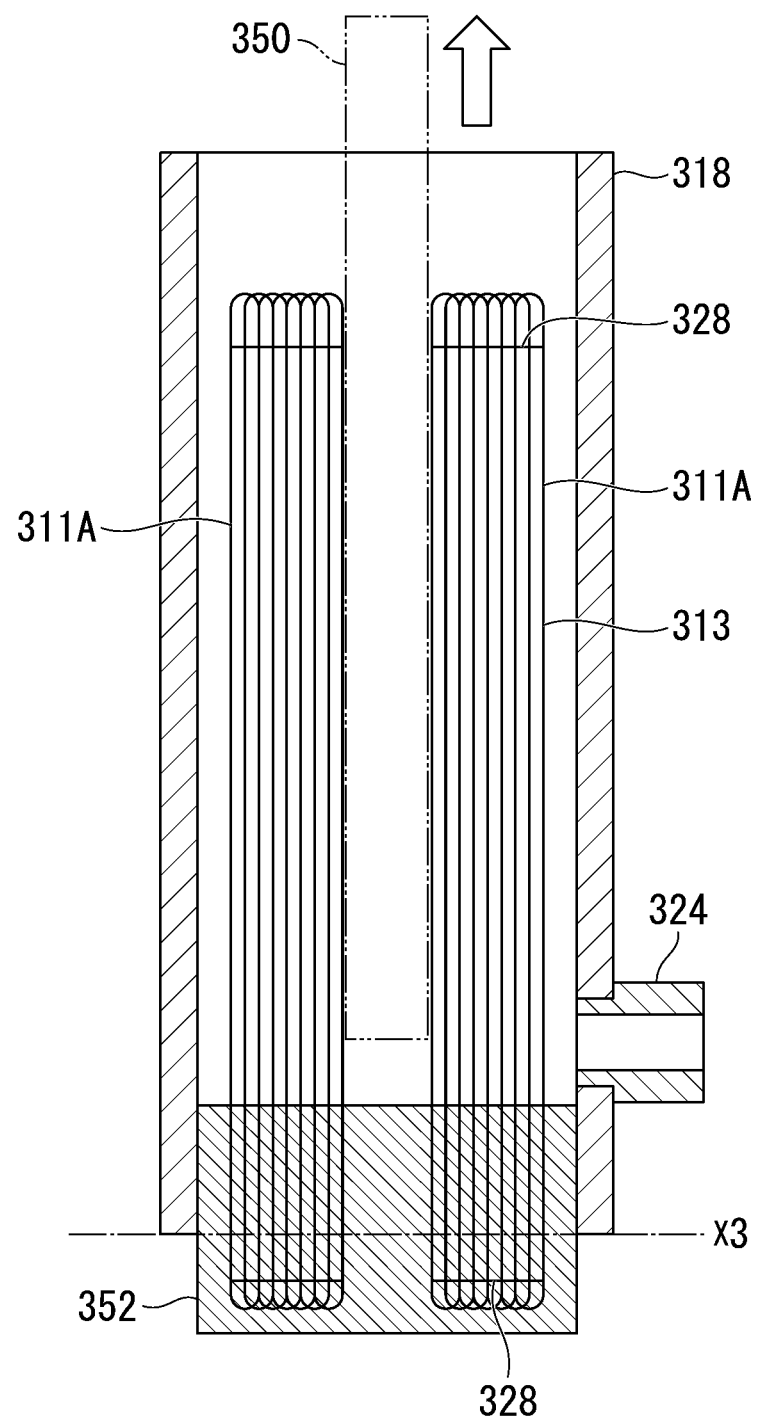
FIG. 18 is a cross-sectional view illustrating a process of the method of manufacturing the external circulation-type hollow fiber membrane module of FIG. 14.

For example, as illustrated in FIG. 16, a long hollow fiber membrane 311A is repeatedly folded back in a U-shape a plurality of times alternately in opposite directions to obtain a belt-like hollow fiber membrane sheet 313. On both end sides in the width direction in the hollow fiber membrane sheet 313, the hollow fiber membrane 311A is knitted in the length direction of the sheet by the warp 328, and portions extending in the width direction in the hollow fiber membrane 311A are connected to each other. Subsequently, as illustrated in FIG. 17, the hollow fiber membrane sheet 313 is wound around a columnar core rod 350. As illustrated in FIG. 18, after the hollow fiber membrane sheet 313 wound around the core rod 350 is inserted into the case body 318 and pulling out the core rod 350, one end of the hollow fiber membrane sheet 313 is fixed to the first open end 318a side of the case body 318 by a potting resin 352 using a known method such as a centrifugation method. In this instance, a U-turn portion of the hollow fiber membrane 311A on a side fixed by the potting resin 352 in the hollow fiber membrane sheet 313 and a part of the potting resin 352 protrude from the case body 318. Further, when the hollow fiber membrane sheet 313 and a protruding portion of the potting resin 352 are cut off by a plane X3 along the first open end 318a of the case body 318, the cylindrical hollow fiber membrane bundle 310 is formed such that the end surface 311a of each hollow fiber membrane 311 folded back in the U-shape is fixed to the case body 318 by the potting portion 316 in an open state and the cavity 312 is formed inside. Subsequently, the module 31 is obtained by attaching the first lid member 320 and the second lid member 322 to both ends of the case body 318.

Hereinafter, an operation mechanism of the module 31 will be described. For example, the module 31 can be used as follows.

In the module 31, the liquid is allowed to flow into the case body 318 of the case 314 from the first port 324, and the liquid is allowed to flow out from the third port 322c. In this way, the liquid is circulated outside each hollow fiber membrane 311 in a region on the second end 310b side of the hollow fiber membrane bundle 310 with respect to the potting portion 316 in the case 314.

A configuration for allowing the liquid to flow in from the first port 324 and flow out from the third port 322c is not particularly limited. For example, it is possible to adopt a configuration in which the first port 324 is connected to a pump to pump the liquid, or a configuration in which the third port 322c is connected to a pump to draw the liquid.

The liquid flowing in from the first port 324 passes between the respective hollow fiber membranes 311 from the outside of the hollow fiber membrane bundle 310 toward the cavity 312 on the inside while turning around to the opposite side from the first port 324 in the hollow fiber membrane bundle 310 by passing through the space 326 between the hollow fiber membrane bundle 310 and the inner wall surface of the case body 318 in the case 314. For example, when the second port 320c of the first lid member 320 is connected to a vacuum pump and evacuated, dissolved gas of the liquid passing between the respective hollow fiber membranes 311 is taken into the hollow fiber membranes 311 and flows out from the second port 320c, and thus the liquid can be deaerated. In addition, when the second port 320c of the first lid member 320 is connected to an aeration pump to supply gas, it is possible to supply gas to the liquid passing between the respective hollow fiber membranes 311 through the respective hollow fiber membranes 311.

In the module 31, only the hollow fiber membrane bundle 310 is provided in a region between the potting portion 316 and the second end 310b of the hollow fiber membrane bundle 310 in the case 314, and nothing is arranged in the cavity 312 on the inside of the cylindrical hollow fiber membrane bundle 310. In this way, in the case 314, the liquid passing between the hollow fiber membranes 311 can smoothly move without being blocked over the entire hollow fiber membrane bundle 310 from the space 326 outside the hollow fiber membrane bundle 310 to the cavity 312 on the inside. For this reason, even when the flow rate of the liquid to be circulated is increased by increasing the size of the module, the liquid tends to flow from the space 326 outside the hollow fiber membrane bundle 310 toward the cavity 312 on the inside over the entire hollow fiber membrane bundle 310. Accordingly, it is possible to inhibit the liquid from unevenly flowing through a part of the space 326 in the case 314, and thus it is possible to suppress a decrease in efficiency of deaeration or aeration.

As described above, in the external circulation-type hollow fiber membrane module of the third aspect of the invention, only the hollow fiber membrane bundle is provided in the region between the potting portion and the second end of the hollow fiber membrane bundle in the case. In this way, since the liquid passing through the respective hollow fiber membranes can move without being blocked between the outside of the tubular hollow fiber membrane bundle and the cavity on the inside of the hollow fiber membrane bundle over the entire hollow fiber membrane bundle, even when the flow rate of the liquid to be circulated is increased by increasing the size of the module, the liquid is inhibited from unevenly flowing in the case, and it is possible to suppress a decrease in efficiency of deaeration or aeration.

Incidentally, the external circulation-type hollow fiber membrane module of the third aspect of the invention is not limited to the module 31 described above. For example, in the external circulation-type hollow fiber membrane module of the third aspect of the invention, each hollow fiber membrane forming the hollow fiber membrane bundle may not be folded back in the U-shape, and the second end on the opposite side from the first end fixed by the potting portion may correspond to a free end in a state in which an open end thereof is buried and closed by resin, etc.

The external circulation-type hollow fiber membrane module of the invention may correspond to a combination of the first aspect and the second aspect, may correspond to a combination of the first aspect and the third aspect, may correspond to a combination of the second aspect and the third aspect, and may correspond to a combination of the first aspect, the second aspect, and the third aspect.

Hereinafter, even though the invention will be described in detail by examples, the invention is not limited by the following description.

[Melt Flow Index (MFR)]

The MFR of resin was measured at a test temperature of 190° C. and a test load of 21.18 N according to ASTM D1238 E conditions.

[Gurley Bending Resistance]

Using a Gurley type bending resistance tester, the Gurley bending resistance of the hollow fiber membrane was measured in accordance with the JIS L 1096A method. Seven hollow fiber membrane bundles in which hollow fiber membranes are folded back in units of 32 hollow fiber membranes (32 fil) were used as measurement samples, and a measurement sample size was set to have a width of 25 to 26 mm and a length of 51 mm.

Example A1

An external circulation-type hollow fiber membrane module having the same aspect as that of the module 11 illustrated in FIG. 1 was produced.

A composite hollow fiber membrane having a three-layer structure which includes a porous support layer formed of high-density polyethylene resin (MFR: 1.35 g/10 min) on an inside and an outside of a homogeneous layer formed of metallocene low-density polyethylene resin (MFR: 1.0 g/10 min) was used as the hollow fiber membrane 111. An outer diameter of the composite hollow fiber membrane was set to 197 µm, an inner diameter thereof was set to 133 and a membrane thickness thereof was set to 32 µm. The Gurley bending resistance of the composite hollow fiber membrane was 5 mN.

The inner diameter of the case body 116 in the case 112 was 52 mm. The hollow fiber membrane bundle 110 was fixed in the case 112 by the potting portion 124 so that an effective membrane area was 1.42 m². The filling rate of the hollow fiber membrane bundle 110 in the case 112 in a cross section obtained by cutting the case 112 in a direction perpendicular to the length direction of the hollow fiber membrane bundle 110 was 30%.

A ring having a rectangular cross section in which a width D1 in the direction along the central axis L11 is 5 mm, an inner diameter is 46 mm, and a protrusion height H1 is 3 mm was used as the short-path prevention body 114. A distance d12 from a position of the central axis L12 of the first port 122 to the short-path prevention body 114 was set to 9 mm, and d12/d11 was set to 0.075.

Example A2

An external circulation-type hollow fiber membrane module was produced similarly to Example A1 except that the outer diameter of the composite hollow fiber membrane was set to 283 µm, the inner diameter thereof was set to 199 the Gurley bending resistance thereof was changed to 20 mN, the hollow fiber membrane bundle 110 was fixed in the case 112 by the potting portion 124 so that the effective membrane area becomes 1.15 m², and the filling rate of the hollow fiber membrane bundle 110 in the case 112 set to 30%.

Example A3

An external circulation-type hollow fiber membrane module was produced similarly to Example A1 except that the short-path prevention body was not provided in the case.

Example A4

An external circulation-type hollow fiber membrane module was produced similarly to Example A2 except that the short-path prevention body was not provided in the case.

[Evaluation of Deaeration Performance]

With respect to the external circulation-type hollow fiber membrane module of each example, water conduction was performed such that water flows in from the first port (liquid flow-in port) and water flows out from the third port (liquid flow-out port), the second port (ventilation port) was connected to a vacuum pump, and deaeration was performed by reducing the pressure at a vacuum degree of −88 kPa. A temperature of water was set to 25° C. The flow rate of water to be externally circulated was changed at 250, 500, 750, 1,000, 1,250, and 1,500 mL/min, and the dissolved oxygen removal rate in the treated water after deaeration at each flow rate was measured.

The dissolved oxygen removal rate was obtained from Equation (2) below by measuring each of a dissolved oxygen amount $M_1$ (mg/L) of raw water before the deaeration treatment and a dissolved oxygen amount $M_2$ (mg/L) of treated water after the deaeration treatment using an optical DO meter FD 0925 (Central Science).

Dissolved oxygen removal rate (%)=[($M_1$−$M_2$)/$M_1$]× 100　　　　　　　　　　(2)

Figure 7:
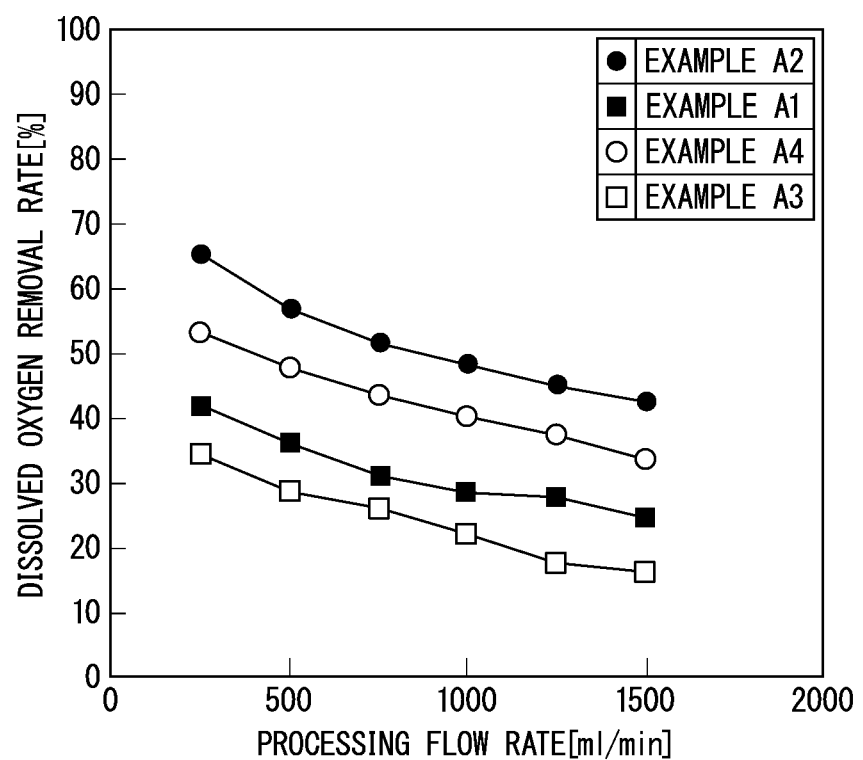
FIG. 7 is a diagram illustrating a graph plotting a dissolved oxygen removal rate with respect to a processing flow rate in examples A1 to A4 of the invention.

Results are shown in FIG. 7.

As illustrated in FIG. 7, in the modules of Examples A1, A2, and A4 satisfying one or both of a condition that the short-path prevention body is provided and a condition that the Gurley bending resistance of the hollow fiber membrane is 15 mN or more, the short-path prevention body was not provided, and the dissolved oxygen removal rate of the treated water was high and the deaeration performance was high when compared to the module of Example A3 in which the Gurley bending resistance of the hollow fiber membrane is less than 15 mN.

Example A5

An external circulation-type hollow fiber membrane module was produced similarly to Example A1 except that the inner diameter of the case body 116 was set to 48 mm, the inner diameter of the short-path prevention body 114 was set to 46 mm, the protrusion height H1 was set to 3 mm, the effective membrane area of the hollow fiber membrane bundle 110 was set to 1.63 m², and d12/d11 was set to 0.060.

Example A6

An external circulation-type hollow fiber membrane module was produced similarly to Example A5 except that the outer diameter of the composite hollow fiber membrane was set to 283 μm, the inner diameter thereof was set to 199 μm, the Gurley bending resistance thereof was changed to 20 mN, and the effective membrane area of the hollow fiber membrane bundle 110 was set to 1.21 m².

Example A7

An external circulation-type hollow fiber membrane module was produced similarly to Example A5 except that the short-path prevention body was not provided in the case.

Example A8

An external circulation-type hollow fiber membrane module was produced similarly to Example A6 except that the short-path prevention body was not provided in the case.

[Evaluation of Deaeration Performance]

With respect to the external circulation-type hollow fiber membrane module of each example, water conduction was performed such that water flows in from the liquid flow-in port and water flows out from the liquid flow-out port, the second port (ventilation port) was connected to a vacuum pump, and deaeration was performed by reducing the pressure at a vacuum degree of −88 kPa. A temperature of water was set to 25° C. The flow rate of water to be externally circulated was set to 1,500 mL/min. In tests (i) to (iv) in which a water conduction mode was set as follows, the dissolved oxygen removal rate in the treated water after deaeration at each flow rate was measured. The dissolved oxygen removal rate was obtained from the above Equation (2).

Test (i): In a state in which the module is vertically placed so that the first port 122 is on the lower side and the third port 120c is on the upper side, water conduction was performed using the first port 122 as the liquid flow-in port and the third port 120c as the liquid flow-out port (up-flow, side-in).

Test (ii): In a state in which the module is vertically placed so that the third port 120c is on the lower side and the first port 122 is on the upper side, water conduction was performed using the third port 120c as the liquid flow-in port and the first port 122 as the liquid flow-out port (up-flow, cap-in).

Test (iii): In a state in which the module is horizontally placed so that both the first port 122 and the third port 120c are horizontal, water conduction was performed using the first port 122 as the liquid flow-in port and the third port 120c as the liquid flow-out port (side-flow, side-in).

Test (iv): In a state in which the module is horizontally placed so that both the first port 122 and the third port 120c are horizontal, water conduction was performed using the third port 120c as the liquid flow-in port and the first port 122 as the liquid flow-out port (side-flow, cap-in).

Figure 21:
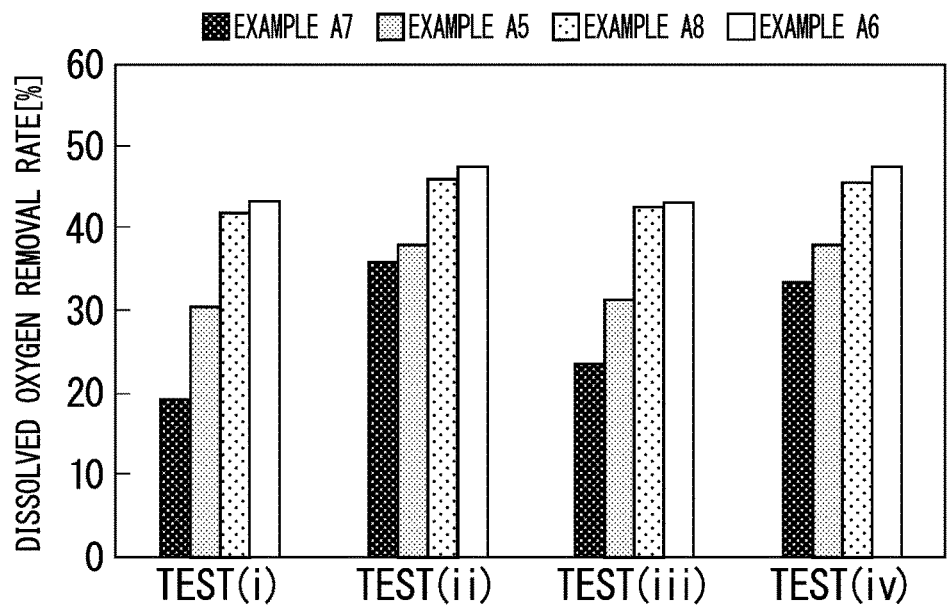
FIG. 21 is a diagram illustrating a graph plotting a dissolved oxygen removal rate for each water conduction direction in examples A5 to A6 of the invention.

Results are shown in FIG. 21.

As illustrated in FIG. 21, in the modules of Examples A5, A6, and A8 satisfying one or both of a condition that the short-path prevention body is provided and a condition that the Gurley bending resistance of the hollow fiber membrane is 15 mN or more, the short-path prevention body was not provided. Further, when compared to the module of Example A7 in which the Gurley bending resistance of the hollow fiber membrane is less than 15 mN, the dissolved oxygen removal rate of the treated water was high, the deaeration performance was high, and a difference in dissolved oxygen removal rate according to each test method was small in any of tests (i) to (iv). As described above, in the modules of Examples A5, A6, and A8, the deaeration performance was high when the to-be-treated liquid flows in the vertical direction or in the horizontal direction.

Production Example B1

A composite hollow fiber membrane A having a three-layer structure which includes porous support layers on both the inside and the outside of a homogeneous layer was produced using metallocene low-density polyethylene (MFR: 1.0 g/10 min) as a material for forming the homogeneous layer and high-density polyethylene (MFR: 1.35 g/10 min) as a material for forming the porous support layer. An outer diameter of the composite hollow fiber membrane was set to 197 μm, an inner diameter thereof was set to 133 μm, and a membrane thickness thereof was set to 32 μm. A Gurley bending resistance of the obtained composite hollow fiber membrane A was 5 mN.

Production Examples B2 and B3

Composite hollow fiber membranes B and C were produced similarly to Production Example B1 except that the materials for forming the homogeneous layer and the porous support layer, and the outer diameter, inner diameter and membrane thickness of the hollow fiber membrane were changed as shown in Table 1. Table 1 shows the Gurley bending resistances of the obtained composite hollow fiber membranes B and C.

Production Example B4

A composite hollow fiber membrane D having a three-layer structure which includes porous support layers on both the inside and the outside of a homogeneous layer was produced using linear low-density polyethylene (MFR: 18.5 g/10 min) as a material for forming the homogeneous layer and high-density polyethylene (MFR: 5.2 g/10 min) as a material for forming the porous support layer. An outer diameter of the composite hollow fiber membrane D was set to 284 μm, an inner diameter thereof was set to 206 μm, and a membrane thickness thereof was set to 39 μm. A Gurley bending resistance of the obtained composite hollow fiber membrane D was 12 mN.

TABLE 1

|  |  | Production Example B1 | Production Example B2 | Production Example B3 | Production Example B4 |
|---|---|---|---|---|---|
| Composite hollow fiber membrane |  | A | B | C | D |
| Homogeneous layer | Type of resin | Metallocene low-density PE | | | Linear low-density PE |
|  | MFR [m/min] | 1.00 | | | 18.5 |
|  | Density [g/cm$^3$] | 0.906 | | | 0.918 |
| Porous support layer | Type of resin | High-density PE | | | |
|  | MFR [m/min] | 1.35 | | | 5.2 |
|  | Density [g/cm$^3$] | 0.963 | | | 0.964 |
| Outer diameter [μm] |  | 197 | 283 | 303 | 284 |
| Inner diameter [μm] |  | 133 | 199 | 209 | 206 |
| Membrane thickness [μm] |  | 32 | 42 | 47 | 39 |
| Gurley bending resistance [mN] |  | 5 | 20 | 24 | 12 |

Example B1

The module 21 illustrated in FIG. 8 was produced. As the hollow fiber membrane 211, the composite hollow fiber membrane B was used. The inner diameter of the case body 218 was 30 mm, and the columnar hollow fiber membrane bundle 210 having a height of 135 mm and an effective membrane area of 0.46 m$^2$ was filled at a filling rate of 30% and fixed in the case 214.

Example B2

An external circulation-type hollow fiber membrane module was produced similarly to Example B1 except that the hollow fiber membrane 211 was changed to a composite hollow fiber membrane C and the columnar hollow fiber membrane bundle 210 having a height of 135 mm and an effective membrane area of 0.43 m$^2$ was filled at a filling rate of 30% and fixed in the case 214.

Examples B3 to B5

An external circulation-type hollow fiber membrane module was produced similarly to Example B1 except that the hollow fiber membrane 211 was changed to a composite hollow fiber membrane A, and the diameter, the height, the effective membrane area, and the filling rate of the hollow fiber membrane bundle 210 were changed as shown in Table 2.

Examples B6 and B7

An external circulation-type hollow fiber membrane module was produced similarly to Example B1 except that the hollow fiber membrane 211 was changed to a composite hollow fiber membrane D, and the diameter, the height, the effective membrane area, and the filling rate of the hollow fiber membrane bundle 210 were changed as shown in Table 2.

TABLE 2

|  |  | Example B1 | Example B2 | Example B3 | Example B4 | Example B5 | Example B6 | Example B7 |
|---|---|---|---|---|---|---|---|---|
| Type of hollow fiber membrane 11 |  | Composite hollow fiber membrane B | Composite hollow fiber membrane C | Composite hollow fiber membrane A | Composite hollow fiber membrane A | Composite hollow fiber membrane A | Composite hollow fiber membrane D | Composite hollow fiber membrane D |
| Hollow fiber membrane bundle 10 | Inner diameter of case [mm] | 30 | 30 | 30 | 30 | 30 | 30 | 30 |
|  | Height [mm] | 135 | 135 | 63 | 93 | 123 | 84 | 123 |
|  | Effective membrane area [m$^2$] | 0.46 | 0.43 | 0.30 | 0.45 | 0.59 | 0.28 | 0.41 |
|  | Filling rate [%] | 30 | 30 | 30 | 30 | 30 | 30 | 30 |

[Evaluation of Deaeration Performance]

With respect to the external circulation-type hollow fiber membrane module of each example, water conduction was performed such that water flows in from the first port and water flows out from the third port, the second port was connected to a vacuum pump, and deaeration was performed by reducing the pressure at a vacuum degree of 100 Torr. A temperature of water was set to 25° C. The flow rate of water to be externally circulated was changed at 100, 200, 300, and 400 mL/min, and the dissolved oxygen removal rate in the treated water after deaeration at each flow rate was measured.

The dissolved oxygen removal rate was obtained from the above Equation (2).

Figure 13:
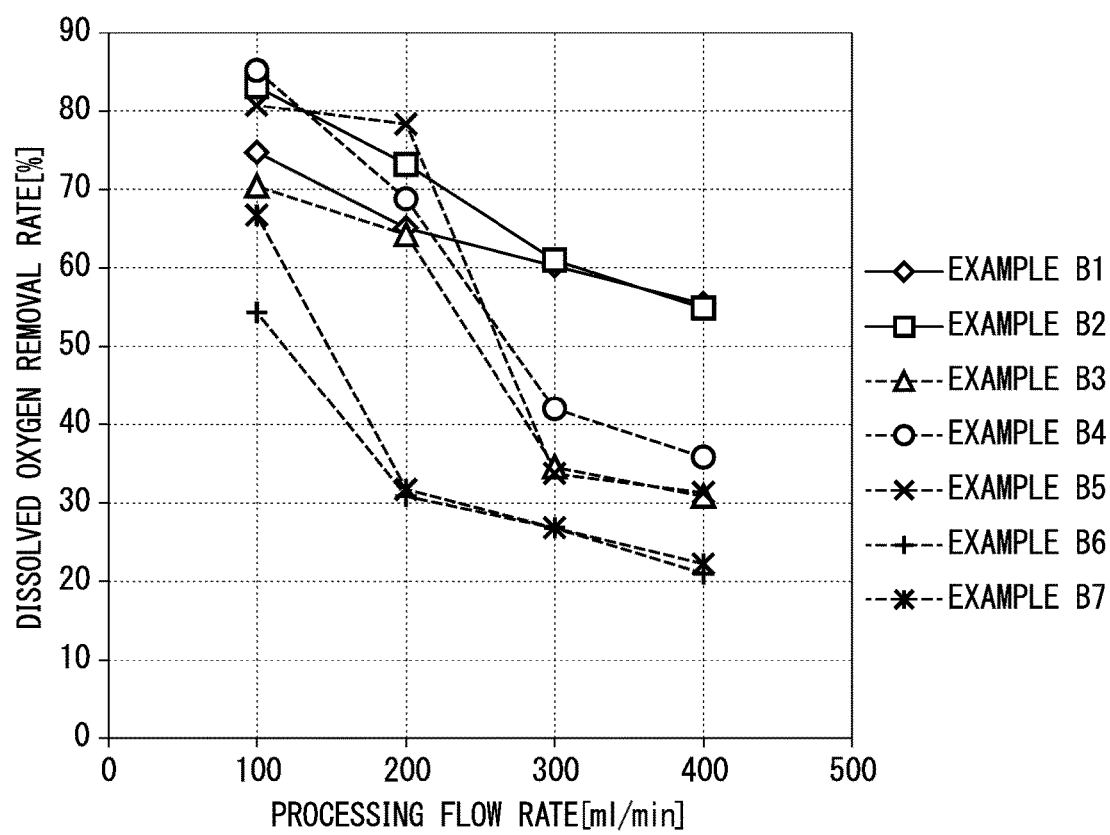
FIG. 13 is a diagram illustrating a graph plotting a dissolved oxygen removal rate with respect to a processing flow rate in examples B1 to B7 of the invention.

Results are shown in FIG. 13.

As illustrated in FIG. 13, in the external circulation-type hollow fiber membrane modules of Examples B1 and B2 in which the hollow fiber membrane bundle is formed using the hollow fiber membrane having the Gurley bending resistance of 15 mN or more, the dissolved oxygen removal rate was high and the deaeration performance was excellent even when the flow rate of the treated water was high comparing to the external circulation-type hollow fiber membrane modules of Examples B3 to B7 using the hollow fiber membrane having the Gurley bending resistance less than 15 mN.

Example C1

A module 31 illustrated in FIG. 14 was produced. A composite hollow fiber membrane (product name "MHF130EPE") manufactured by Mitsubishi Chemical Corporation was used as the hollow fiber membrane 311.

The inner diameter of the case body 318 was set to 52 mm. The cylindrical hollow fiber membrane bundle 310 in which the columnar cavity 312 having the diameter of 10 mm is formed therein was obtained using the core rod 350 having the diameter of 10 mm and fixed in the case 314 by the potting portion 316 so that the effective membrane area becomes 1.45 m². The filling rate of the hollow fiber membrane bundle 310 in the case 314 in the cross section obtained by cutting the case 314 in the direction perpendicular to the length direction of the hollow fiber membrane bundle 310 was 28%.

Example C2

Figure 20:
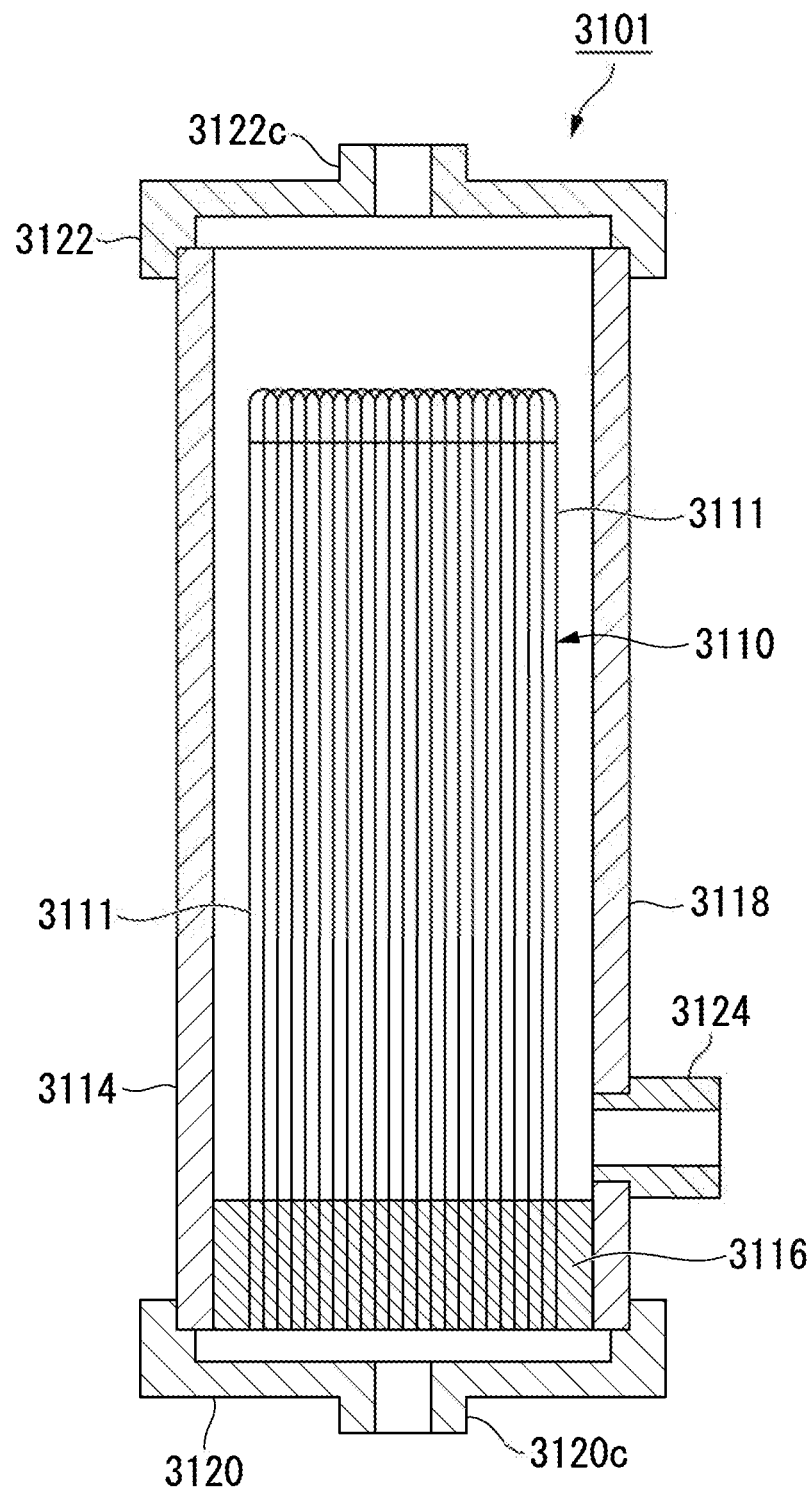
FIG. 20 is a cross-sectional view illustrating an example of a conventional external circulation-type hollow fiber membrane module.

An external circulation-type hollow fiber membrane module 3101 illustrated in FIG. 20 was produced, and the external circulation-type hollow fiber membrane module 3101 corresponds to the same aspect as that of the module 31 of Example C1 except that the hollow fiber membrane bundle is changed from the cylindrical shape to a columnar shape and no cavity is formed inside. The filling rate of the hollow fiber membrane bundle 3110 in a case 3114 in a cross section obtained by cutting the case 3114 in a direction perpendicular to a length direction of the hollow fiber membrane bundle 3110 was the same as the filling rate of Example C1.

Example C3

An external circulation-type hollow fiber membrane module was produced similarly to Example C1 except that the inner diameter of the case body 318 was set to 48 mm, the same composite hollow fiber membrane as that of Example A2 having the outer diameter of 283 μm, the inner diameter of 199 μm, and the Gurley bending resistance of 20 mN was used as the hollow fiber membrane to form a hollow fiber membrane bundle having a columnar shape and an effective membrane area of 1.21 m² in which the cavity is not formed inside, and a filling rate of the hollow fiber membrane bundle was set to 30%.

Example C4

An external circulation-type hollow fiber membrane module was produced similarly to Example C1 except that the inner diameter of the case body 318 was set to 48 mm, the same composite hollow fiber membrane as that of Example A2 having the outer diameter of 283 the inner diameter of 199 μm, and the Gurley bending resistance of 20 mN was used as the hollow fiber membrane, and a filling rate of a cylindrical hollow fiber membrane bundle in which the columnar cavity 312 having the diameter of 10 mm was formed inside was set to 30%.

Example C5

An external circulation-type hollow fiber membrane module was produced similarly to Example C1 except that the inner diameter of the case body 318 was set to 48 mm, the same composite hollow fiber membrane as that of Example A1 having the outer diameter of 197 μm, the inner diameter of 133 μm, and the Gurley bending resistance of 5 mN was used as the hollow fiber membrane to form a hollow fiber membrane bundle having a columnar shape and an effective membrane area of 1.63 m² in which the cavity is not formed inside, and a filling rate of the hollow fiber membrane bundle was set to 30%.

Evaluation of Deaeration Performance

With respect to the external circulation-type hollow fiber membrane module of each example, water conduction was performed such that water flows in from the first port and water flows out from the third port, the second port was connected to a vacuum pump, and deaeration was performed by reducing the pressure at a vacuum degree of −88 kPa. A temperature of water was set to 25° C. The flow rate of water to be externally circulated was changed at 250, 500, 750, 1,000, 1,250, and 1,500 mL/min, and the dissolved oxygen removal rate in the treated water after deaeration at each flow rate was measured.

The dissolved oxygen removal rate was obtained from the above Equation (2).

Figure 19:
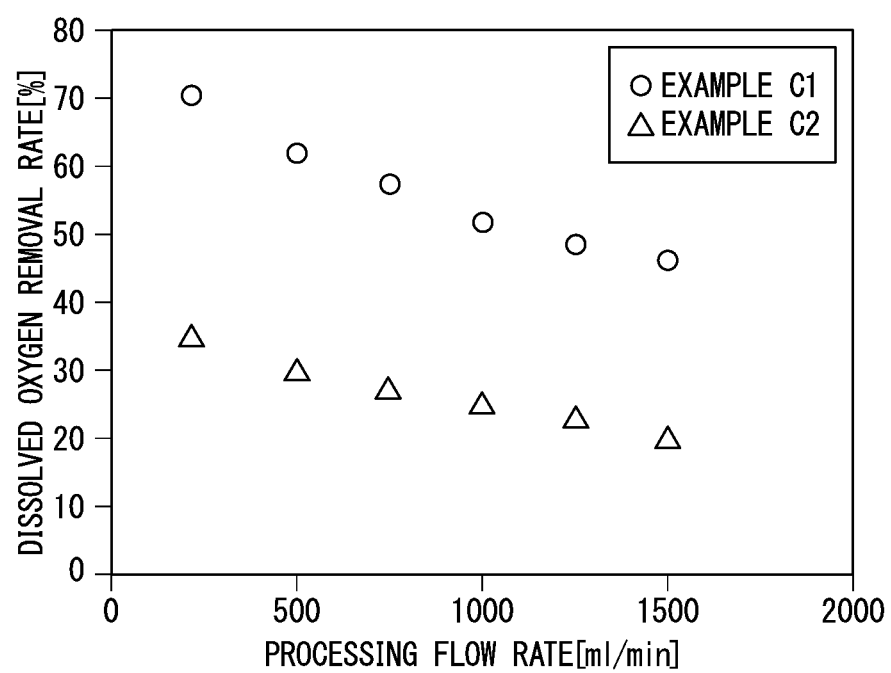
FIG. 19 is a diagram illustrating a graph plotting a dissolved oxygen removal rate with respect to a processing flow rate in examples C1 to C2 of the invention.
Figure 22:
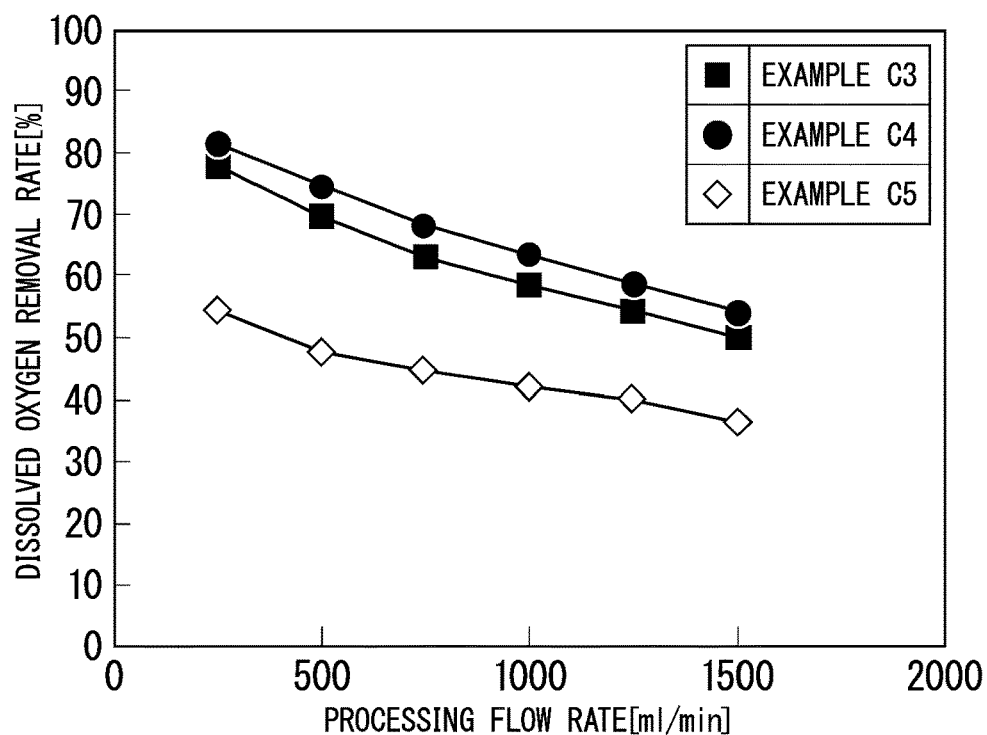
FIG. 22 is a diagram illustrating a graph plotting a dissolved oxygen removal rate with respect to a processing flow rate in examples C3 to C5 of the invention.

Results of Example C1 and Example C2 are shown in FIG. 19, and results of Examples C3 to C5 are shown in FIG. 22.

As illustrated in FIG. 19, in the external circulation-type hollow fiber membrane module of Example C1 in which the hollow fiber membrane bundle having the cavity formed therein is included and only the hollow fiber membrane bundle is provided in the region between the potting portion and the second end of the hollow fiber membrane bundle in the case, the dissolved oxygen removal rate of the treated water was high and the deaeration performance was high when compared to the external circulation-type hollow fiber membrane module of Example C2 including the hollow fiber membrane bundle which has the columnar shape and does not have the cavity formed therein.

As illustrated in FIG. 22, in the module of Example C3 in which the Gurley bending resistance of the hollow fiber membrane is 15 mN or more and the cavity is not present in the hollow fiber membrane bundle and the module of Example C4 in which the Gurley bending resistance of the hollow fiber membrane is 15 mN or more and the cavity is present in the hollow fiber membrane bundle, the dissolved oxygen removal rate of the treated water was high and the deaeration performance was high when compared to the module of Example C5 in which the Gurley bending resistance of the hollow fiber membrane is less than 15 mN and the cavity is not present in the hollow fiber membrane bundle.

EXPLANATIONS OF LETTERS OR NUMERALS 11, 12, 21, 22, 31 EXTERNAL CIRCULATION-TYPE HOLLOW FIBER MEMBRANE MODULE
110, 110A, 210, 210A, 310 HOLLOW FIBER MEMBRANE BUNDLE
110a, 210a, 310a FIRST END
110b, 210b, 310b SECOND END
111, 211, 311 HOLLOW FIBER MEMBRANE
111a, 111c, 111d OPEN END
112, 214, 314 CASE
114 SHORT-PATH PREVENTION BODY
116, 116A, 218, 218A, 318 CASE BODY
118, 220, 320 FIRST LID MEMBER
120, 222, 322 SECOND LID MEMBER
122, 224, 324 FIRST PORT
124, 216, 216A, 216B, 316 POTTING PORTION
128 GAP
220c SECOND PORT
222c THIRD PORT
230 FOURTH PORT
312 CAVITY
320c SECOND PORT
322c THIRD PORT

DRAWINGS

FIG. 1
FIG. 2
FIG. 3
FIG. 4
FIG. 5
FIG. 6
FIG. 7
DISSOLVED OXYGEN REMOVAL RATE [%]
PROCESSING FLOW RATE [ml/min]
EXAMPLE A2
EXAMPLE A1
EXAMPLE A4
EXAMPLE A3
FIG. 8
FIG. 9
FIG. 10
FIG. 11
FIG. 12
FIG. 13
DISSOLVED OXYGEN REMOVAL RATE [%]
PROCESSING FLOW RATE [mL/min]
EXAMPLE B1
EXAMPLE B2
EXAMPLE B3
EXAMPLE B4
EXAMPLE B5
EXAMPLE B6
EXAMPLE B7
FIG. 14
FIG. 15
FIG. 16
FIG. 17
FIG. 18
FIG. 19
DISSOLVED OXYGEN REMOVAL RATE [%]
PROCESSING FLOW RATE [mL/min]
EXAMPLE C1
EXAMPLE C2
FIG. 20
FIG. 21
DISSOLVED OXYGEN REMOVAL RATE [%]
EXAMPLE A7
EXAMPLE A5
EXAMPLE A8
EXAMPLE A6
TEST (i)
TEST (ii)
TEST (iii)
TEST (iv)
FIG. 22
DISSOLVED OXYGEN REMOVAL RATE [%]
PROCESSING FLOW RATE [ml/min]
EXAMPLE C3
EXAMPLE C4
EXAMPLE C5

The invention claimed is:

1. An external circulation-type hollow fiber membrane module for removing gas from a to-be-treated liquid or supplying gas to the to-be-treated liquid, the hollow fiber membrane module comprising:
a hollow fiber membrane bundle formed of a plurality of aligned hollow fiber membranes;
a case in which the hollow fiber membrane bundle is accommodated; and
a short-path prevention body that blocks a flow of a to-be-treated liquid in a gap between the hollow fiber membrane bundle and the case, and
a cylindrical first port that communicates with the inside of a case body is provided at a portion of the case body of the case near a first open end such that the cylindrical first port protrudes outward from an outer peripheral surface of the case body,
wherein a first end of the hollow fiber membrane bundle in a length direction is fixed in the case by a potting portion while an open state of an open end of each of the hollow fiber membranes is maintained,
wherein the case body of the case has a length of from 5 cm to 50 cm,
wherein a distance from a position of a central axis of the cylindrical first port to a second end of the hollow fiber membrane bundle is set to d11, in millimeters, and a distance from a position of the central axis of the cylindrical first port to the short-path prevention body is set to d12, in millimeters, and when the cylindrical first port is a liquid flow-in port, d12/d11 is from 0.01 to 0.2,
wherein the short-path prevention body is in contact with the hollow fiber membrane bundle,
the short-path prevention body is provided on a downstream side of the liquid flow-in port that allows the to-be-treated liquid to flow in around the plurality of aligned hollow fiber membranes in the case and protrudes from an inner surface of the case,
wherein the liquid flow-in port is provided near the first open end of the case body, and a liquid flow-out port is provided near a second opening end opposite side from the first open end, and
wherein a bending resistance of the hollow fiber membrane is from 15 mN to 25 mN, and wherein the bending resistance is measured by a method according to JISL1096 using a sample including seven hollow fiber membrane bundles having a width of from 25 mm to 26 mm and a length of 51 mm, in which the hollow fiber membranes are folded back in units of 32 hollow fiber membranes (32 fil).

2. The external circulation-type hollow fiber membrane module according to claim 1, wherein the to-be-treated liquid flows in one direction in the length direction in the case, and a partition that changes the flow of the to-be-treated liquid other than the short-path prevention body is not provided in the case.

3. The external circulation-type hollow fiber membrane module according to claim 1, wherein the short-path prevention body has an annular shape that surrounds the hollow fiber membrane bundle over an entire circumference.

4. The external circulation-type hollow fiber membrane module according claim 1, Wherein each of the plurality of aligned hollow fiber membranes is a composite hollow fiber membrane that comprises a homogeneous layer having gas permeability and a porous support layer supporting the homogeneous layer.

5. The external circulation-type hollow fiber membrane module according to claim 1, wherein each of the plurality of aligned hollow fiber membranes is bundled in a state of being folded in a U-shape at a center in the length direction and fixed in the case by the potting portion while open ends on both sides of each of the plurality of aligned hollow fiber membranes maintain an open state at the first end.

6. The external circulation-type hollow fiber membrane module according to claim 5, wherein positions of ends of the respective hollow fiber membranes folded back in U-shapes are aligned on substantially the same plane at the second end of the hollow fiber membrane bundle on an opposite side from the first end.

7. The external circulation-type hollow fiber membrane module according to claim 1, wherein the plurality of aligned hollow fiber membranes is bundled in a state of being connected to each other by a warp.

8. An external circulation-type hollow fiber membrane module for removing gas from a to-be-treated liquid or supplying gas to the to-be-treated liquid, the hollow fiber membrane module comprising:
- a hollow fiber membrane bundle formed of a plurality of aligned hollow fiber membranes; and
- a case in which the hollow fiber membrane bundle is accommodated,
- wherein at least a first end of the hollow fiber membrane bundle in a length direction is fixed in the case by a potting portion while an open state of an open end of each of the plurality of aligned hollow fiber membranes is maintained,
- a bending resistance of the plurality of aligned hollow fiber membranes is from 15 mN to 25 mN, and
- the bending resistance is measured by a method according to JIS11096 using a sample including seven hollow fiber membrane bundles having a width of from 25 mm to 26 mm and a length of 51 mm, in which the hollow fiber membranes are folded back in units of 32 hollow fiber membranes (32 fil),
- wherein an outer diameter of each of the plurality of the aligned hollow fiber membranes is 350 µm or less,
- wherein a breaking strength of each of the plurality of the aligned hollow fiber membranes is at least 0,5 N/fil and a breaking elongation of each of the plurality of the aligned hollow fiber membranes is at least 50%, and
- wherein a filling rate of the hollow fiber membrane bundle in the case in a cross section obtained by cutting the case in a direction perpendicular to the length direction of the hollow fiber membrane bundle is from 20% to 50%.

9. The external circulation-type hollow fiber membrane module according to claim 8, wherein both the first end of the hollow fiber membrane bundle formed by aligning a plurality of hollow fiber membranes in one direction and a second end on an opposite side from the first end are fixed in the case by potting portions, respectively.

10. The external circulation-type hollow fiber membrane module according to claim 8, wherein each of the plurality of aligned hollow fiber membranes is a composite hollow fiber membrane that comprises a homogeneous layer having gas permeability and a porous support layer supporting the homogeneous layer.

11. An external circulation-type hollow fiber membrane module, comprising:
- a hollow fiber membrane bundle in which a plurality of hollow fiber membranes is bundled in a tubular shape so that a cavity is formed inside; and
- a case in which the hollow fiber membrane bundle is accommodated,
- wherein
- a first end of the hollow fiber membrane bundle in a length direction is fixed in the case by a potting portion while an end surface of each of the plurality of hollow fiber membranes is open,
- a second end on an opposite side from the first end in the hollow fiber membrane bundle is not fixed in the case, and each of the plurality of hollow fiber membranes at the second end of the hollow fiber membrane bundle correspond to a free end,
- a liquid being circulated outside each of the hollow fiber membranes on a second end side of the potting portion in the case,
- the hollow fiber membrane bundle is exclusively provided in a region between the potting portion and the second end in the case, and
- the hollow fiber membranes are arranged to form one tube having one hollow passage in a center, wherein a wall of the one tube is formed by the plurality of layers of the hollow fiber membranes such that each layer of the plurality of layers is arranged concentrically around the one hollow passage and each layer of the plurality of layers is formed from the hollow fiber membranes arranged in a circular shape.

* * * * *